US011455455B1

(12) United States Patent
Marinelli et al.

(10) Patent No.: US 11,455,455 B1
(45) Date of Patent: Sep. 27, 2022

(54) 3D COUPLING CONTROL RULES FOR AUTO-ROUTING

(71) Applicant: Dialog Semiconductor (UK) Limited, London (GB)

(72) Inventors: Giuliano Fernandes Marinelli, Royal Wootton Bassett (GB); John Fairnie, Swindon (GB); Simon Nicol, Chepstow (GB)

(73) Assignee: Dialog Semiconductor (UK) Limited, London (GB)

( * ) Notice: Subject to any disclaimer, the term of this patent is extended or adjusted under 35 U.S.C. 154(b) by 384 days.

(21) Appl. No.: 16/707,714

(22) Filed: Dec. 9, 2019

(51) Int. Cl.
*G06F 30/3953* (2020.01)
*G06F 30/398* (2020.01)
*G06F 30/392* (2020.01)
*G06F 119/10* (2020.01)

(52) U.S. Cl.
CPC ........ *G06F 30/3953* (2020.01); *G06F 30/392* (2020.01); *G06F 30/398* (2020.01); *G06F 2119/10* (2020.01)

(58) Field of Classification Search
CPC .. G06F 30/3953; G06F 30/392; G06F 30/398; G06F 2119/10; G06F 30/394
USPC ...................................................... 257/798
See application file for complete search history.

(56) References Cited

U.S. PATENT DOCUMENTS

| 5,610,833 | A | 3/1997 | Chang et al. |
| 8,095,903 | B2 | 1/2012 | Birch et al. |
| 8,244,491 | B1* | 8/2012 | Zhang ................. G06F 30/3312 716/108 |
| 8,751,996 | B1 | 6/2014 | Birch et al. |
| 8,949,755 | B2 | 2/2015 | Helvey |
| 8,949,760 | B2 | 2/2015 | Birch et al. |
| 2008/0184186 | A1 | 7/2008 | Belaidi et al. |

OTHER PUBLICATIONS

"IC Layout Must Avoid Crosstalk Problems,", Tak Young, EE Times, Jun. 5, 2002, 3 pages, found Aug. 22, 2019: https://www.eetimes.com/document.asp?doc_id=1277678#.

(Continued)

*Primary Examiner* — Tu-Tu V Ho
(74) *Attorney, Agent, or Firm* — Saile Ackerman LLC; Stephen B. Ackerman; Billy Knowles

(57) ABSTRACT

A method for controlling crosstalk between multiple noise generating wiring tracks and a quiet wiring track by determining a parallel common run length and determining the number of threshold lengths into which the maximum parallel common run length is divided. The space between the quiet wiring track and each wiring track of the noise generating wiring tracks is determined. Multiple metal wiring track structures on one metal wiring level of and multiple metal wiring track structures on another metal wiring level of an integrated circuit that are formed as segments that have various distances between the metal wiring track structures of one wiring level and multiple metal wiring track structures of the other wiring level to form a stair-step or ladder structure that controls individually the spacing applied between multiple active noise wiring track structures and one quiet wiring track structure.

40 Claims, 13 Drawing Sheets

(56) References Cited

OTHER PUBLICATIONS

"Crosstalk Noise Control in Gridless General-Area Routing," by C. C. Chang et al., https://cadlab.cs.ucla.edu/~cong/papers/tau99_crosstalk.pdf, Jan. 1998, 6 pages.

"An Innovative Methodology to Reduce Routing Capacitance of ADC Channels," by Gurinder Singh Baghria et al., Design & Reuse, found Aug. 22, 2019: https://www.design-reuse.com/articles/35350/routing-capacitance-of-adc-channels-reduction.html.

"Global Routing with Crosstalk Constraints," by Hai Zhou et al., IEEE Transactions on Computer-Aided Design of Integrated Circuits and Systems, vol. 18, No. 11, Nov. 1999, pp. 1683-1688.

"Topological Channel Routing," by Shinichiro Haruyama et al., IEEE Transactions on Computer-Aided Design, vol. 11, No. 10, Oct. 1992, pp. 1177-1197.

"Parasitic Extraction: Current State of the Art and Future Trends," by William H. Kao et al., Proceedings of the IEEE, vol. 89, No. 5, May 2001, pp. 729-739.

"Interconnect Modeling: A Physical Design Perspective," by Atsuchi Kurokawa et al., IEEE Transactions on Electron Devices, vol. 56, No. 9, Sep. 2009, pp. 1840-1851.

\* cited by examiner

| Total Length "Lt"[m] | 2.00E-03 | ε[F.m] | | 7.97E-11 |
|---|---|---|---|---|
| n divisions of Lt | 40 | Metal Thickness[m] | | 3.70E-07 |
| Total Coupling C[F] | 3.00E-14 | Distance +/- 1 Metal layer[m] | | 5.00E-07 |
| | | Distance +/- 2 Metal layer[m] | | 1.37E-06 |

FIG. 8A

| | Thr[μm] | C[fF] | spc-Z[μm] | spc-Y[μm] | spc-X[μm] | Horizontal spc reduction | |
|---|---|---|---|---|---|---|---|
| | | | | | | spc-Y/spc-Z[%] | spc-X/spc-Z[%] |
| 1 | 2.44 | 1.46 | 0.05 | 0.00 | 0.00 | 100.00 | 100.00 |
| 2 | 4.88 | 1.43 | 0.10 | 0.00 | 0.00 | 100.00 | 100.00 |
| 3 | 7.32 | 1.39 | 0.16 | 0.00 | 0.00 | 100.00 | 100.00 |
| 4 | 9.76 | 1.35 | 0.21 | 0.00 | 0.00 | 100.00 | 100.00 |
| 5 | 12.20 | 1.32 | 0.27 | 0.00 | 0.00 | 100.00 | 100.00 |
| 6 | 14.63 | 1.28 | 0.34 | 0.00 | 0.00 | 100.00 | 100.00 |
| 7 | 17.07 | 1.24 | 0.40 | 0.00 | 0.00 | 100.00 | 100.00 |
| 8 | 19.51 | 1.21 | 0.48 | 0.00 | 0.00 | 100.00 | 100.00 |
| 9 | 21.95 | 1.17 | 0.55 | 0.24 | 0.00 | 57.33 | 100.00 |
| 10 | 24.39 | 1.13 | 0.63 | 0.39 | 0.00 | 38.50 | 100.00 |
| 11 | 26.83 | 1.10 | 0.72 | 0.52 | 0.00 | 27.98 | 100.00 |
| 12 | 29.27 | 1.06 | 0.81 | 0.64 | 0.00 | 21.12 | 100.00 |
| 13 | 31.71 | 1.02 | 0.91 | 0.76 | 0.00 | 16.34 | 100.00 |
| 14 | 34.15 | 0.99 | 1.02 | 0.89 | 0.00 | 12.86 | 100.00 |
| 15 | 36.59 | 0.95 | 1.13 | 1.02 | 0.00 | 10.24 | 100.00 |
| 16 | 39.02 | 0.91 | 1.26 | 1.15 | 0.00 | 8.24 | 100.00 |
| 17 | 41.46 | 0.88 | 1.39 | 1.30 | 0.25 | 6.67 | 82.15 |
| 18 | 43.90 | 0.84 | 1.54 | 1.45 | 0.70 | 5.43 | 54.51 |
| 19 | 46.34 | 0.80 | 1.70 | 1.62 | 1.00 | 4.44 | 40.95 |
| 20 | 48.78 | 0.77 | 1.87 | 1.80 | 1.28 | 3.63 | 31.85 |
| 21 | 51.22 | 0.73 | 2.06 | 2.00 | 1.54 | 2.98 | 25.21 |
| 22 | 53.66 | 0.70 | 2.28 | 2.22 | 1.82 | 2.44 | 20.14 |
| 23 | 56.10 | 0.66 | 2.51 | 2.46 | 2.11 | 2.00 | 16.19 |
| 24 | 58.54 | 0.62 | 2.78 | 2.73 | 2.41 | 1.64 | 13.04 |
| 25 | 60.98 | 0.59 | 3.07 | 3.03 | 2.75 | 1.33 | 10.50 |
| 26 | 63.41 | 0.55 | 3.41 | 3.37 | 3.12 | 1.08 | 8.44 |
| 27 | 65.85 | 0.51 | 3.79 | 3.76 | 3.53 | 0.87 | 6.76 |
| 28 | 68.29 | 0.48 | 4.23 | 4.20 | 4.01 | 0.70 | 5.38 |
| 29 | 70.73 | 0.44 | 4.75 | 4.72 | 4.55 | 0.56 | 4.25 |
| 30 | 73.17 | 0.40 | 5.36 | 5.34 | 5.18 | 0.44 | 3.32 |
| 31 | 75.61 | 0.37 | 6.09 | 6.07 | 5.94 | 0.34 | 2.56 |
| 32 | 78.05 | 0.33 | 6.99 | 6.97 | 6.85 | 0.26 | 1.94 |
| 33 | 80.49 | 0.29 | 8.11 | 8.09 | 7.99 | 0.19 | 1.44 |
| 34 | 82.93 | 0.26 | 9.55 | 9.53 | 9.45 | 0.14 | 1.03 |
| 35 | 85.37 | 0.22 | 11.47 | 11.46 | 11.38 | 0.10 | 0.72 |
| 36 | 87.80 | 0.18 | 14.15 | 14.14 | 14.09 | 0.06 | 0.47 |
| 37 | 90.24 | 0.15 | 18.18 | 18.18 | 18.13 | 0.04 | 0.28 |
| 38 | 92.68 | 0.11 | 24.90 | 24.89 | 24.86 | 0.02 | 0.15 |
| 39 | 95.12 | 0.07 | 38.33 | 38.33 | 38.31 | 0.01 | 0.06 |
| 40 | 97.56 | 0.04 | 78.63 | 78.63 | 78.62 | 0.00 | 0.02 |

FIG. 8B

3D COUPLING CONTROL RULES FOR AUTO-ROUTING

TECHNICAL FIELD

This disclosure relates generally to a method, computer program, and an electronic design system automation for routing inter-circuit wiring tracks on an integrated circuit substrate. More particularly, this disclosure relates to a method, computer program, and an electronic design automation system for determining three-dimensional capacitive coupling rules for inter-circuit wiring tracks.

BACKGROUND

Electronic Design Automation is a classification of programs that are created for designing electronic devices and the components used to assemble electronic devices. These electronic components include integrated circuits, power systems, memory systems, magnetic data storage devices, display devices, and other devices and subsystems. The programs are stored on non-transitory memory devices, such as computer main memory, hard disk drives, or other data storage devices. The electronic design automation programs are structured for the design of the system structure of the electronic devices, the logic and circuit structure of the electronic components, the design of test methods for the logic and circuit structures, the physical design of the logic and circuit structures, and verification of the logic and circuit design structures and the physical design.

SUMMARY

An object of this disclosure is to provide a method, system, and a program retained by a non-transitory data storage device for controlling, individually, the spacing applied between wiring tracks of an integrated circuit.

Another object of this disclosure is to provide a method, system, and program retained by a non-transitory data storage device for determining a common parallel run length threshold between two wiring tracks for controlling the length in which a specific spacing is applied.

Further, another object of this disclosure is to provide a method, system, and a program retained by a non-transitory data storage device for determining auto-routing spacing rules that take advantage of the metal wiring track layer stack height and control the spacing between the metal layer tracks combinations independently.

Still, further, another object of this disclosure is to provide an integrated circuit having multiple levels of wiring track that have common parallel run length threshold between two wiring tracks with controlled the length and specific spacing.

To accomplish at least one of these objects of this disclosure, a method for controlling crosstalk between a plurality of noise generating wiring tracks and at least one quiet wiring track by determining a maximum coupling capacitance allowed between one active wiring track and one quiet wiring that is placed on the same wiring track layer. The maximum coupling capacitance allowed between one active wiring track and one quiet wiring track is determined based on the circuit's electrical constraints. These voltage constraints include but are not restricted to the maximum voltage ripple allowed, operational frequency, and other specifics from the circuit topology. From the maximum coupling capacitance, a parallel common run length is ascertained, and the number of threshold lengths into which the maximum parallel common run length is divided is established. The total length and the total number of divisions, both are variables defined per process design specifications. The total length is more dependent on die size, wherein a larger die size permits a longer the total length. The number of divisions depends on the granularity for increasing the space between tracks. If there is a larger granularity, an auto-routing algorithm has a higher probability of converging in an auto-routed solution. The method continues with determining a space between the quiet wiring track and each wiring track of the plurality of noise generating wiring tracks dependent upon the maximum capacitive coupling and the number of threshold lengths of each of the plurality of wiring tracks.

The individual threshold lengths are determined by the equation:

$$Thri = \frac{Lt * i}{\frac{n*(n+1)}{2}}$$

Where:
Thri is the threshold length of a segment i of the threshold lengths of the wiring track length;
Lt is the total length of the noise generating wiring tracks and the quiet wiring track; and
n is the number of threshold length segments of the noise generating wiring tracks and the quiet wiring track.

The coupling capacitance for each individual threshold length is determined by the equation:

$$Ci = \frac{Ct*(n-i)}{\frac{n*(n+1)}{2}}$$

Where:
Ci is the coupling capacitance of an individual threshold length of one of the plurality of noise generating wiring tracks and the quiet wiring track;
Ct is the maximum coupling capacitance allowed for the total length of the noise generating wiring tracks and the quiet wiring track; and
n is the number of threshold length segments of the noise generating wiring tracks and the quiet wiring track.

The space between the quiet wiring track and each wiring track of the plurality of noise generating wiring tracks is determined by the equation:

$$SPCi = \frac{Thri * Mtck * \varepsilon}{Ci}$$

Where:
SPCi is the space between the quiet wiring track and each wiring track of the plurality of noise generating wiring tracks;
Thri is the threshold length of a segment i of the threshold lengths of the wiring track length;
Mtck is the thickness of the quiet wiring track and each wiring track of the plurality of noise generating wiring track;
$\varepsilon$ is the permittivity of the inter-metal dielectric between the quiet wiring track and each wiring track of the plurality of noise generating wiring tracks; and $C_i$ is the coupling capacitance of an individual threshold length of one of the plurality of noise generating wiring tracks and the quiet wiring track.

The horizontal spacing between the quiet wiring track and one of the plurality of noise generating wiring tracks one each of the wiring track layers is determined by the equation:

$$SPCn = \sqrt{rn^2 - h^2}$$

Where:
- SPCn is the horizontal spacing between the quiet wiring track and one of the plurality of noise generating wiring tracks;
- r is the radial distance between quiet wiring track and one of the plurality of noise generating wiring tracks;
- n is the number of threshold length segments of the noise generating wiring tracks and the quiet wiring track; and
- h is the vertical distance between the metal stack layer combinations of the wiring tracks.

In various embodiments that accomplish at least one of the objects of this disclosure, an integrated circuit has multiple metal wiring track structures on one metal wiring level of the integrated circuit and multiple metal wiring track structures on another metal wiring level of the integrated circuit that are formed as segments that have various distances between the metal wiring track structures of one wiring level and multiple metal wiring track structures of the other wiring level to form a stair-step or ladder structure that controls individually the spacing applied between multiple active noise wiring track structures and one quiet wiring track structure thus achieving a three-dimensional control of a noise coupling capacitance. The individual common parallel run length threshold controls which active noise wiring track structures length and the spacing is applied. The benefit of the stair step or ladder structure takes advantage of the metal layer stack height and controls the spacing between the active noise wiring track structures combinations independently, therefore achieving effective coupling control wiring rules for auto-routing designs, which directly saves routing channel area.

In various embodiments that accomplish at least one of the objects of this disclosure, a computer system is configured for retaining program code retained by a non-transitory data storage device that when decoded and executed on a processor of the computer system performs the method for controlling crosstalk between a plurality of noise generating wiring tracks and at least one quiet wiring track by determining a maximum coupling capacitance allowed between one active wiring track and one quiet wiring that is placed on the same wiring track layer, as described above.

In various other embodiments a non-transitory data storage device has program code recorded upon it that when decoded and executed on a computer system performs the method for controlling crosstalk between a plurality of noise generating wiring tracks and at least one quiet wiring track by determining a maximum coupling capacitance allowed between one active wiring track and one quiet wiring that is placed on the same wiring track layer, as described above.

BRIEF DESCRIPTION OF THE DRAWINGS

FIG. 8A is a table that illustrates the specifications to calculate the spacing rules for an example of this disclosure.

FIG. 8B is a table of the results of the rules generation employing the specification of the table of FIG. 8A of this disclosure.

DETAILED DESCRIPTION

Figure 1A:
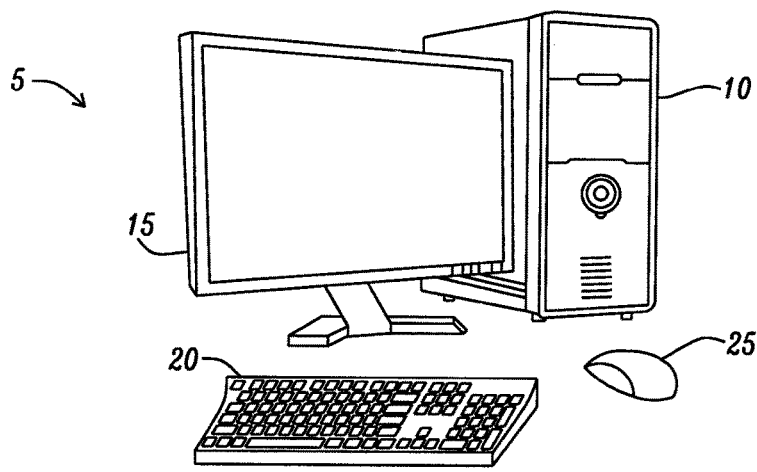
FIG. 1A is a diagram of a computer system in which an electronic design automation system of the related art is retained and executed.
Figure 1B:
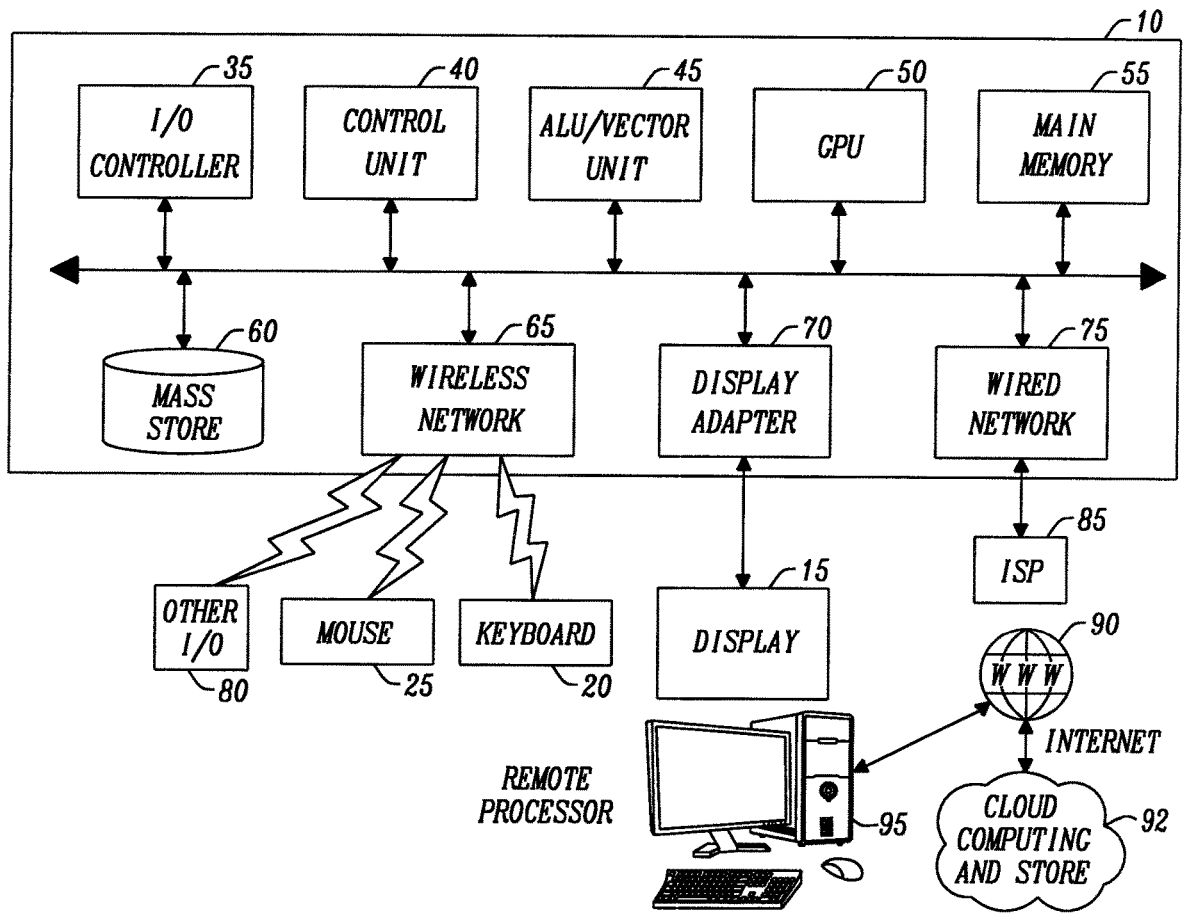
FIG. 1B is a block diagram of the computer system of FIG. 1a in which an electronic design automation system of the related art is retained and executed.

FIG. 1A is a diagram of a computer system 5 in which an electronic design automation system of the related is retained and executed. FIG. 1B is a block diagram of computer system 5 of FIG. 1a in which an electronic design automation system of the related art is retained and executed. Referring to FIG. 1A, the computer system has a central processing unit 10. A display monitor 15 is connected to the central processing unit 10 to present the results of the central processing unit 10 operations. The keyboard 20 is an input device used by an operator for keying in data and instructions, and the mouse 25 is another input device that is used for moving a cursor across the screen of the display monitor 15 for selecting data for further operations such as copying, deleting, or moving. Referring now to FIG. 1B, the central processing unit 15 has a system bus 30 that is an illustrative interconnection scheme linking the subsystems of the computer system 5. While the system bus 30, as illustrated, connects the subsystems to a common cabling and connector structure. The system bus 30, as shown, is an example only and may be many separate cables with their connectors.

The I/O (Input/Output) controller 35 connects the computer system 10 to input and output devices such as printers, plotters, data input devices, etc. The control unit 40 controls and co-ordinates the activities of all subsystems of the computer system 10. The control unit 40 fetches each program instruction from the computer's memory 55. The program instruction is then decoded by the control unit 40 to interpret the intent of the fetched instruction. The control unit 40 then executes the decoded instruction to perform the requested action. In the execution, the control unit 40 may send instructions to other subsystem units such as the ALUNector Unit 45, the GPU (graphics processor unit) 50, the I/O controller 35, the Main Memory 55, the Mass storage 60 (secondary memory storage), the wireless network 65, the display adapter 70, the wired network unit 75. At the end of the execution, the control unit 40 writes back the results of each execution to an internal register (a temporary storage location) within the control unit 40 or to main memory 55.

In the ALUNector Unit 45, the ALU (arithmetic logic unit) performs arithmetic and logical operations. The Vector Unit performs arithmetical and logical functions on large amounts of data that is retrieved from the main memory. The data is arranged such that it transitions through a parallel pipeline structure improves the number of calculations per unit time.

The GPU (graphics processor unit) 50 is structured for fast rendering of graphics. To achieve this, the GPU 50 has a parallel architecture for rapidly manipulating and altering memory to accelerate the creation of images to be shown on the display monitor 15.

The main memory 55 is an array of semiconductor memory devices such as dynamic random access (DRAM) organized for providing the control unit 40 with locations for retaining and extracting program code and user data for the execution of programs. The control unit 40 extracts the program code for decoding and executions and extracts the user data for operation by the executing program code.

The mass storage 60 may be a secondary semiconductor memory device array or a magnetic hard disk that retains the program code and user data that is not immediately being used. The control unit 40 determines when data is needed from the mass storage 60 and command the main memory 55 to store underused program code or user data in the mass storage and retrieve the needed program code or user data from the mass storage unit 60.

The wireless network unit 65 forms an I/O port that communicates with the I/O controller 35 for the transfer of data from external devices such as the keyboard 20 or the mouse 25. Additionally, the wireless network unit 65 may communicate with other I/O devices 80, such as speakers, earphones, cellular telephones, other computer systems, etc.

The display adapter 70 is in communication with the control unit and the GPU unit 55 to receive graphic and video data for presentation on the display monitor 15. The display adapter 70 encodes the graphic and video data to a video format acceptable by the display monitor 15 and transfer the formatted video data to the display monitor 15.

The wired network adapter 75 accepts network link layer protocols such as Ethernet, asynchronous transfer mode (ATM), etc. The network adapter is in communication with the I/O controller 35 and the control unit 30 to transfer and receive data from an internet service provider (ISP) 85 for communication with the internet 90. The internet 90 permits access to services such as cloud computing and storage 92. These services permit the control unit 40 to access program and user data from the cloud storage 92 and to use the cloud computing resources. Further, the internet 90 permits use of remote processors 95 that are not part of the cloud computing systems 92

Figure 2:
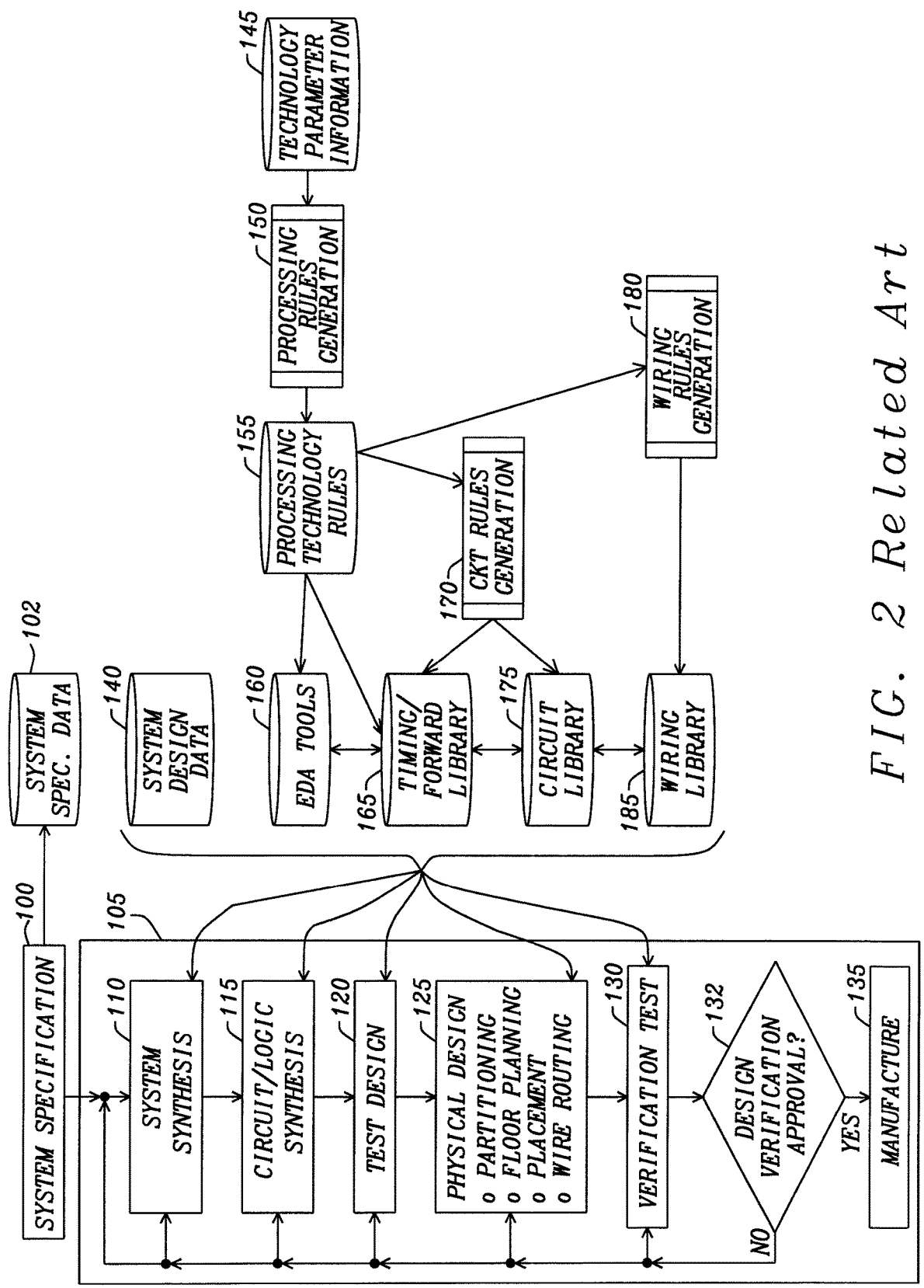
FIG. 2 is a flow diagram of an electronic design automation system of the related art.

FIG. 2 is a flow diagram of an electronic design automation system that is executed on a computer system, such as shown in FIGS. 1*a* and 1*b*. An electronic design has a group of functional specifications 100 created by engineers and designers for an electronic system. The functional specification 100 identifies the technologies that the potential system components will be manufactured from, the functions to be performed, the circuits and logic functions the system must perform, the operating specifications of each of the functions. The system specification 100 is encoded in a high-level hardware descriptor programming language that allows the detailed description of the system and simulation of the functions of the system. The encoded system description is placed in a data storage device 102 that is located in one of the non-transitory memory systems (Main Memory 55, mass storage 60, cloud storage 92, or other non-transitory memory systems)

The system synthesizer 110 is a set of electronic design automation tools that are retained on the EDA tools data storage device 160. When the electronic design automation system 10 is executed by the computer system 10, the encoded electronic design is transferred from the data storage device 102 to the system synthesizer 110 that generates a system functional structure for the various functions to be implemented by the encoded system description. The synthesized system structure is placed in the data storage device 140 that is also located in one of the non-transitory memory systems (Main Memory 55, mass storage 60, cloud storage 92, or other non-transitory memory systems).

The EDA system 105 then executes the circuit/logic synthesizer 115. The synthesized system structure is then retrieved from the data storage device 140 and transferred to the circuit/logic synthesizer 115. The circuit/logic synthesizer 115 then extracts the candidate analog and digital logic circuits from the circuit library 175. The circuit library 175 is created by a circuit rules generator 170. The circuit rules generator 170 retrieves the processing technology rules from the processing technology rules database 155 that is also located in one of the non-transitory memory systems (Main Memory 55, mass storage 60, cloud storage 92, or other non-transitory memory systems). The technology rules database 155 receives the processing rules from the processing rules generator 150 that receive the technology parameter information from the technology parameter information database 145 that is also located in one of the non-transitory memory systems (Main Memory 55, mass storage 60, cloud storage 92, or other non-transitory memory systems). The technology parameter information database 145 describes the processes for manufacturing the transistors and other devices used to create the integrated circuit. The processing rules generator 150 then determines the characteristics for each of the transistor and device types to be used in the integrated circuit. The processing rules generator 150 then stores the determined characteristic in the technology rules database 155.

The circuit rules generator 170 creates a logic circuit library and an analog circuit library that is stored in the circuit library 175. The circuits of the logic circuit library and the analog circuit library may not all be automatically generated and may have been manually generated by a circuit designer.

Once the analog and logic circuits are synthesized by the circuit/logic synthesizer 115, the synthesized electronic system data is stored in the data storage device 140. The electronic design automation system then activates the test design generator 120. The test design generator 120 extracts the synthesized electronic system data from the data storage device 140. The test design generator 120 develops the test patterns that, when executed, verify the success of the circuit and logic synthesis in creating an operating electronic system. The test design generator 120 extracts the synthesized electronic system from the data storage device 140. To develop the test patterns, the test design generator 120 extracts the timing and power information for each of the analog and logic circuits from the timing/power library 165. The circuit rules generator 170 generates the timing and power data for each of the analog and logic circuits. The circuit rules generator 170 stores the timing and power data in the timing and power library 165 for use by the test design generator 120. The test patterns developed by the test design generator 120 are transferred to the data storage device 140.

The electronic design automation system 105 then activates the physical design system 125. The physical design system 125 then extracts the synthesized electronic system data from the data storage device 140. The physical design retrieves the circuit descriptions from the circuit library 175, which includes the layout geometries and dimensions of the devices for each circuit. With the layout geometries and dimensions, the synthesized electronic system data is then partitioned into functional units such as printed circuit cards, integrated circuit chips, and subunits of the integrated circuit chips. Upon completion of the partitioning, the floor-planning operation is carried out.

The floor-planning operation arranges the partitioned analog and logical circuits within the active area allocated on a semiconductor wafer based on the geometries and dimensions of the circuits. The floor-planning operation places the analog and/or logical circuits such that they encompass the area of the integrated circuit to insure effective operation. Once the floor-planning is completed, the floor-planned data is transferred to the data storage device 140.

Upon completion of the floor-planning, the electronic design automation system 105 then activates the placement operation for assigning the locations of the individual analog and logical circuits on the surface of the semiconductor substrate. The placement is generated by algorithms that minimize the wiring distances between the analog and/or logic circuits. Once the placement of the analog and/or logic circuits are placed, the analog and/or logic circuit placement data is transferred to the data storage device 140.

The electronic design automation system 105 then activates the wire routing operations for generating the routing of wiring tracks between the connection points of each net formed by the connections between the analog and/or logical circuits. The placement operation generated a netlist indicating these connections for every terminal of the analog and/or logical circuits on the integrated circuit or subunits of the integrated circuit. The wire routing programs retrieve the wiring rules and any specialized wiring structures from the wiring library 185 that the wire routing operation employs to complete the wiring tracks for each of the connections in each net of the wiring network. The wiring rule generator 180 extracts the wiring process technology description from the processing technology rules database 155 and determines the wiring geometries and dimensions (length, width, and thickness) that are used to determine each wiring segment of a wiring track in making a connection. These geometries and dimensions are used to form the restrictions for each of the wire segments, thus forming the wiring rules that are placed in the wiring rule database 185. Once the wire routing operation is completed, the wiring data is transferred to the data storage device 140.

When the physical design system has completed the creation of the data necessary for manufacturing the integrated circuit, the design verification operation 130 is activated to ensure that design is complete and functional. The test patterns developed by the test design generator 120 are extracted from the data storage device 140 for use by the programs of the design verification operation 130. If the synthesis and design operations of the electronic design system 105 have not successfully created fully functional designs, the design verification operation indicates 132 the failing segment, and the synthesis and design operations are sequentially reactivated. The appropriate design data is retrieved from the storage device 140, and with the test information, the appropriate synthesis or design operation is executed, and the failing segment is corrected. If the synthesis and design operations of the electronic design system 105 have not successfully created fully functional designs, the design verification operation reiterates the process until the design verification indicates that the design is conceptually fully functional. In some cases, when the synthesis and design operations of the electronic design system 105 have not successfully created fully functional designs, human intervention may be required. When the synthesis and design operations of the electronic design system 105 have successfully created fully functional designs, the design verification operation indicates the success 132 and the system design data 140 is transferred to the manufacturing operation 135 for fabrication.

In the physical design system 125, the wire routing operation of a complex integrated circuit must take into consideration crosstalk between each of the wiring tracks between the electronic components requires the consideration of crosstalk between each of the wiring tracks.

Figure 3:
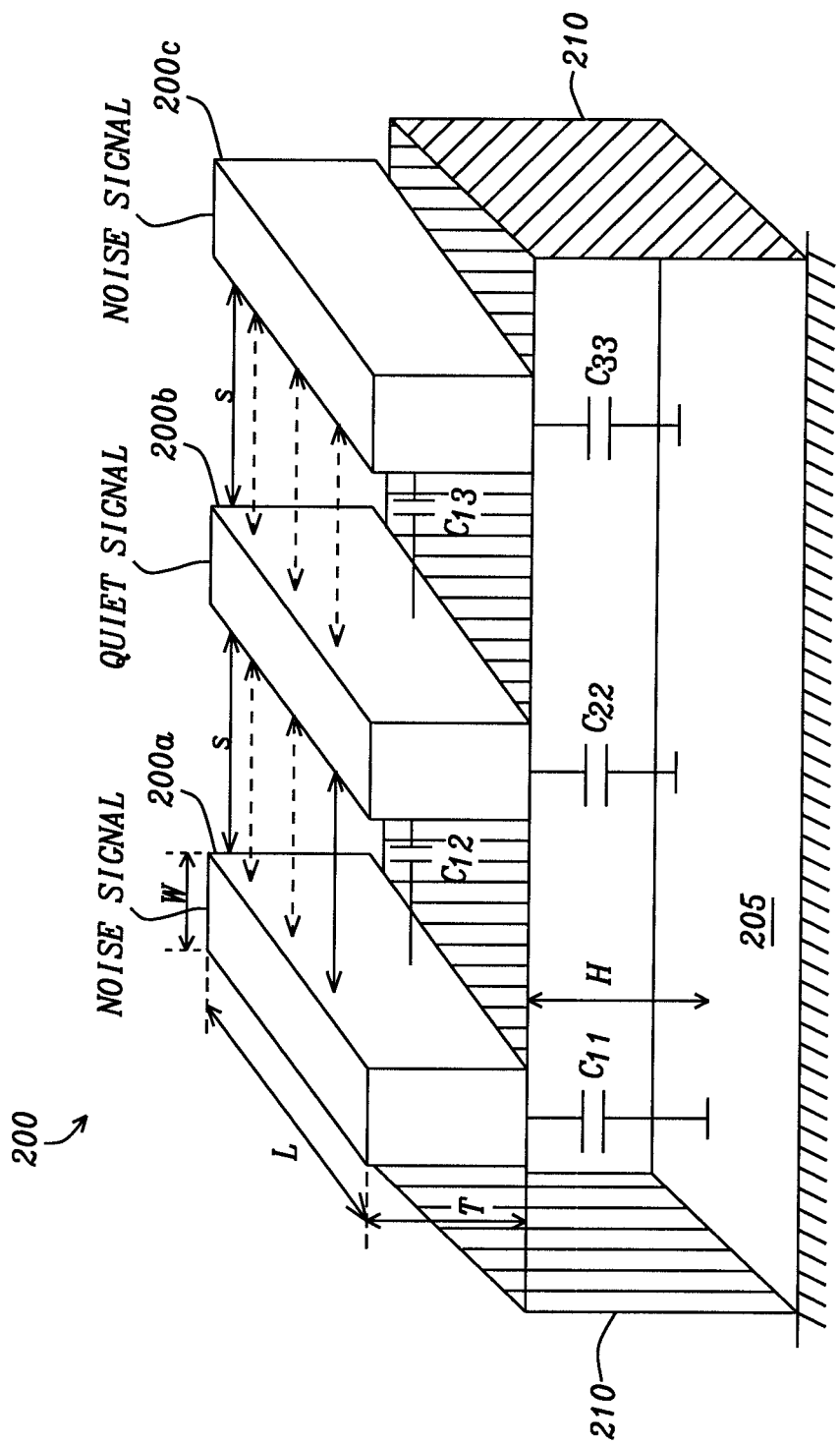
FIG. 3 is a diagram of two active noise wiring track structures and one quiet wiring track structure of the related art.

FIG. 3 is an illustration of three metal wiring structures 200 of an integrated circuit illustrating capacitance coupling of the related art. A semiconductor substrate 205 is structured to be connected to a ground reference point. An insulative material 210, such as silicon dioxide, is deposited on the surface of the substrate 205. The metal wiring structures 200a, 200b, and 200c are then deposited on the insulative material 210. Each of the metal wiring structures 200a, 200b, and 200c have a length L, a width W, a thickness T. The metal wiring structures 200a, 200b, and 200c are further placed at a height H above the grounded substrate. The coupling capacitance between each of the metal wiring structures 200a, 200b, and 200c, as is known in the art, is calculated by the equation:

$$C = \varepsilon_r \varepsilon_0 A / d$$

Where:
C is the capacitance of the parallel plate capacitor;
$\varepsilon_r$ is the dielectric constant (k) (relative permittivity) of dielectric material between the plates of the parallel plate capacitor;
$\varepsilon_0$ is the permittivity of air;
A is the area of the parallel plates; and
d is the distance between the parallel plates of the capacitor.

The capacitance $C_{12}$ and $C_{23}$ between the metal wiring structures 200a and 200b and metal wiring structures 200b and 200c are calculated by the equation:

$$C_{12} = C_{23} = \varepsilon_r \varepsilon_0 L \times T / S$$

Where:
C is the capacitance of the parallel plate capacitor;
$\varepsilon_r$ is the dielectric constant (k) (relative permittivity) of the insulator between the metal wiring structures 200a and 200b and metal wiring structures 200b and 200c.
$\varepsilon_0$ is the permittivity of air;
L is the length of the metal wiring structures 200a, 200b, and 200c;
T is the thickness of the metal wiring structures 200a, 200b, and 200c; and
S is the distance between the metal wiring structures 200a and 200b and metal wiring structures 200b and 200c.

The capacitances $C_{11}$, $C_{22}$, and $C_{33}$ between the metal wiring structures 200a, 200b, and 200c and the semiconductor substrate 205 are calculated by the equation:

$$C_{11} = C_{22} = C_{33} = {\varepsilon_r \varepsilon_0 L \times W}/{H}$$

Where:
C is the capacitance of the parallel plate capacitor
$\varepsilon_r$ is the dielectric constant (k) (relative permittivity) of the insulator between the metal wiring structures 200a and 200b and metal wiring structures 200b and 200c;
$\varepsilon_0$ is the permittivity of air;
L is the length of the metal wiring structures 200a, 200b, and 200c;
W is the width of the metal wiring structures 200a, 200b, and 200c; and
H is the distance between the metal wiring structures 200a and 200b, 200b, and 200c, and the semiconductor substrate 205.

As is known in the art, the coupled voltage to the semiconductor substrate 205 is inversely proportional to the distance H between the metal wiring structures 200a and 200b, 200b, and 200c, and the semiconductor substrate 205. If the distance H is sufficiently large such that any coupled noise will be small and may be disregarded. However, if the distance H is sufficiently small such that any coupled noise is larger and may be detrimental to small signals or voltage present on the metal wiring structures 200b. In standard fabrication, the substrate is sufficiently grounded that any coupled noise will be minimized.

Further, as is known in the art, the coupled voltage from the metal wiring structures 200a and 200c to the metal wiring structure 200a is inversely proportional to the space S between the metal wiring structures 200a and 200b and the metal wiring structures 200b and 200c. In order to minimizing crosstalk interference between the metal wiring structures 200a and 200b and the metal wiring structures 200b and 200c, the current practice for controlling capacitive coupling on auto-routed electrical signals is to apply a larger clearance than the minimum fabrication parameter horizontal spacing allowed between the metal wiring structures 200a and 200b and the metal wiring structures 200b and 200c. The spacing is increased equally through the available metal stack combinations (Metal-1 to Metal-[1+n]). This added spacing between the metal wiring structures 200a and 200b, and the metal wiring structures 200b and 200c. has a large impact on consuming routing channel area.

Figure 4:
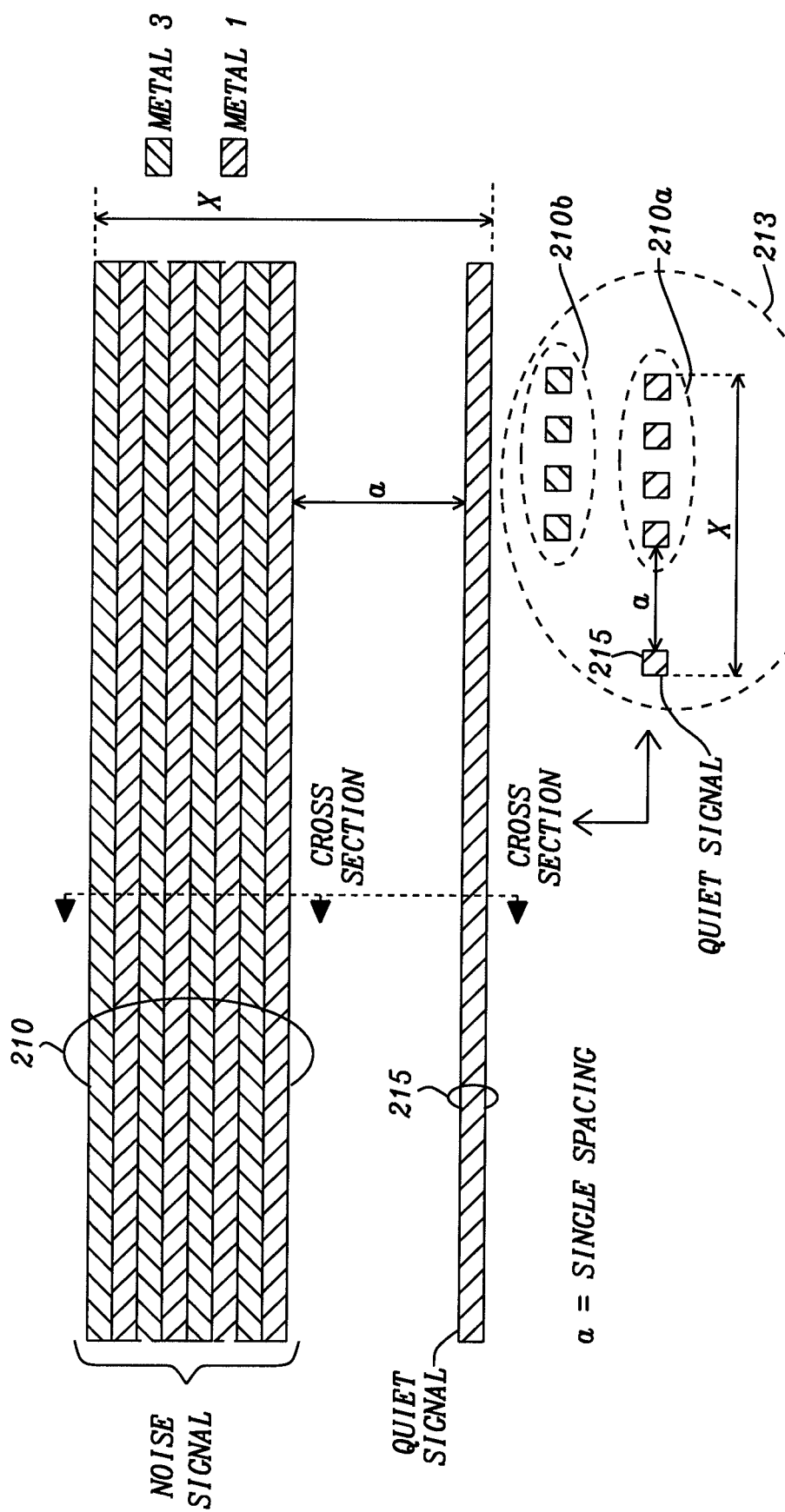
FIG. 4 is a diagram of multiple active noise wiring track structures and one quiet wiring track structure of the related art.

FIG. 4 is a diagram of multiple active noise generating wiring track structures 210 and one quiet wiring track structure 215 of this related art. The noise generating wiring track structures 210 transmit analog or digital signals that couple their signals as noise to the quiet wiring track structure 215. The cross sectional view 213 illustrates a view of the quiet wiring track structure 215 and the noise generating wiring track structures 210a and 210b. The quiet wiring track structure 215 and the noise generating wiring track structures 210a located on the first level metal and the noise generating wiring track structures 210b are located on the third level metal. The quiet wiring track structure 215 may have a low voltage level signal that is transmitted to a receiver with a low threshold voltage level for the receiver circuit or a reference voltage such as the thermal reference voltage of silicon. Any noise coupled from the multiple active noise generating wiring track structures 210 to the quiet wiring track structure 215 causes the signal or reference voltage to be disrupted, causing a failure of the operation of the circuitry. Thus, if the distance from the multiple active noise generating wiring track structures 210 to the quiet wiring track structure 215 is equivalent to the separation of the multiple active noise generating wiring track structures 210, the noise coupled to the quiet wiring track structure 215 causes the failure. To minimize the effect of the noise from the multiple active noise generating wiring track structures 210, the distance a for quiet wiring track structure 215 is increased to decrease the magnitude of the coupling capacitance and thus the amplitude of the coupled noise. The area occupied by the multiple active noise generating wiring track structures 210 and the one quiet wiring track structure 215 is determined by the product of the wiring track length L and the width x of the region occupied by the multiple active noise generating wiring track structures 210 and the one quiet wiring track structure 215. The width of the vacant section has a significant impact on the amount of routing channel area occupied by the multiple active noise generating wiring track structures 210 and the one quiet wiring track structure 215.

Figure 5:
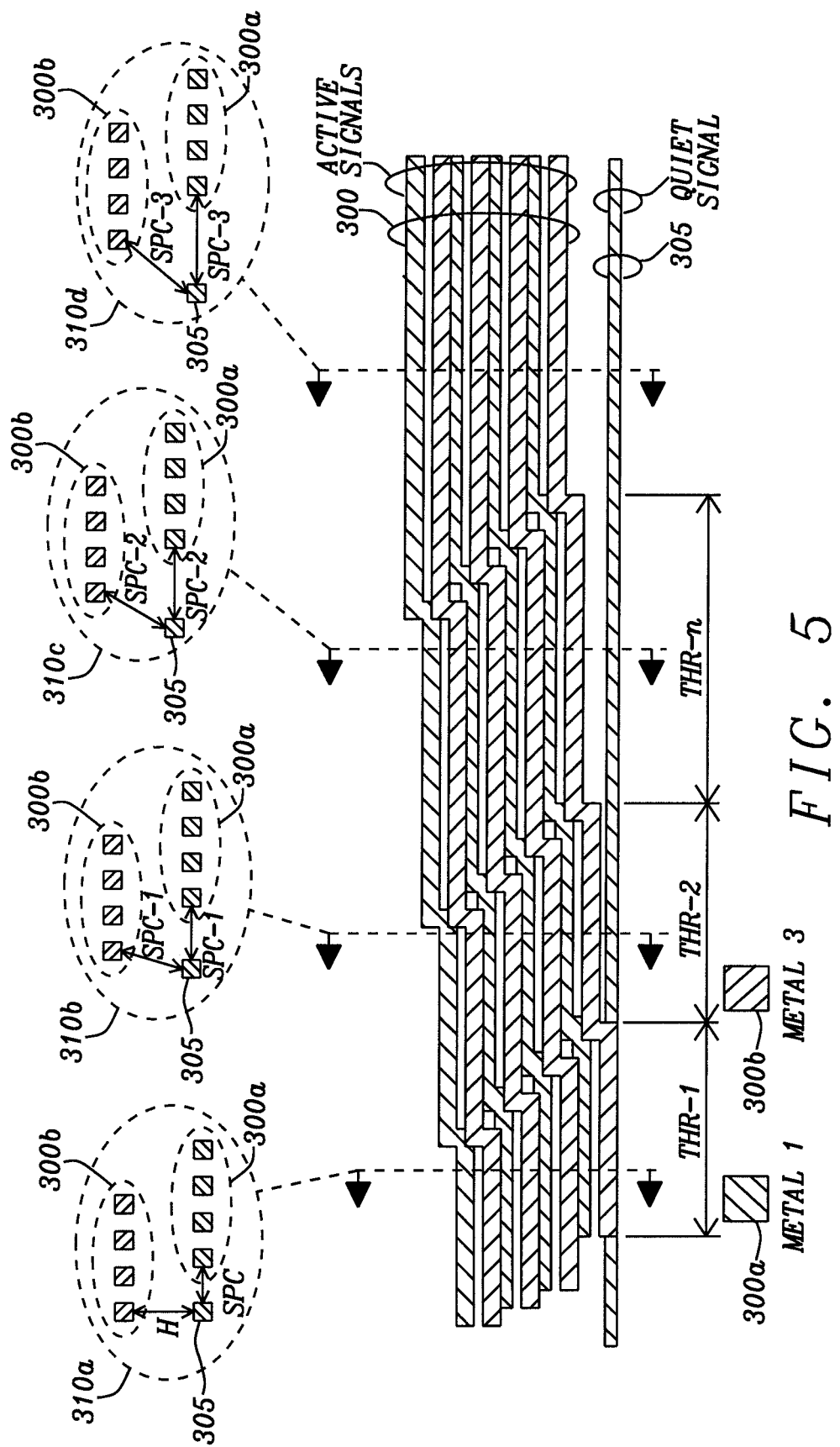
FIG. 5 is a diagram of multiple active noise wiring track structures and one quiet wiring track structure of this disclosure.

This disclosure provides wiring track structures that control the spacing applied between wiring track structures of wiring networks of an integrated circuit of this disclosure. FIG. 5 is a diagram of multiple active noise wiring track structures 300 and one quiet wiring track structure 305 of this disclosure. The active noise wiring track structures 300 are formed of multiple first level metal wiring track structures 300a and multiple third level metal wiring track structures 300b. Each of the multiple first level metal wiring track structures 300a and multiple third level metal wiring track structures 300b are formed as segments that have various distances between the first level metal wiring track structures 300a and multiple third level metal wiring track structures 300b to form a stair-step or ladder structure that controls individually the spacing applied between the multiple active noise wiring track structures 300 and the one quiet wiring track structure 305 thus achieving a three-dimensional control. The individual common parallel run length threshold controls which active noise wiring track structures 300 lengths to which the spacing is applied. The benefit of the stair step or ladder structure takes advantage of the metal layer stack height and controls the spacing between the active noise wiring track structures 300 combinations independently, therefore achieving effective coupling control wiring rules for auto-routing designs, which directly saves routing channel area.

A method to calculate the auto-routing spacing rules begins with specifying the maximum coupling capacitance Ct between any two tracks of the active noise wiring track structures 300 and the quiet wiring track structure 305 on the same metal layer in Faradays (F). The maximum coupling capacitance Ct allowable is dependent on electrical circuit constraints, like the maximum voltage ripple allowed, operational frequency, and other specifics from the circuit topology.

The total length (Lt) and the total number n of segments are variables defined within the design specifications. The total length is more dependent on die size, as larger the die size the longer the total length gets. The number of divisions increases granularity for increasing the space between tracks, and more granularity increases the chances of having the auto-routing algorithms to converge for an auto-routed solution.

The maximum coupling capacitive is determined by the equation:

$$Ct = \sum_{i=1}^{n} \frac{Thri * Mtck}{SPCi} * \varepsilon, \, Ct = \sum_{i=0}^{n} Ct * \left( \frac{n-i}{\frac{n*(n+1)}{2}} \right)$$

Where:
Ct is the maximum coupling capacitance between two wiring track structures 300 and 305;
Thri is the threshold length of a segment i of the wiring track structures 300;
Mtck is the thickness of the wiring track structures 300 and 305;
SPCi is the space between a segment i of the two adjacent wiring track structures 300 and 305;
ε is the permittivity of the insulating layer between the adjacent wiring track structures 300 and 305; and
n is the number of segments i in the wiring track structures 300 and 305.

The total length is determined by the equation:

$$Lt = \sum_{i=1}^{n} Lt * \left( \frac{i}{\frac{n*(n+1)}{2}} \right)$$

Where:
Lt is the total length of the wiring track structures 300 and 305; and
n is the number of segments i in the wiring track structures 300 and 305;

The maximum capacitive coupling for each segment i is determined by the equation:

$$C_i = Ct * \left( \frac{n-i}{\frac{n*(n+1)}{2}} \right)$$

Where:
$C_i$ is the coupling capacitances for each segment i of each of the wiring track structures 300 and 305;
Ct is the maximum total coupling capacitance between two wiring track structures 300 and 305; and n is the number of segments i in the wiring track structures 300 and 305; and
i is equal to (i−1).

The segment i count is equal to (i−1) for coupling capacitance C calculations is due to the equation $$Ct = \sum_{i=0}^{n} Ct * \left( \frac{n-i}{\frac{n*(n+1)}{2}} \right);$$

where the index i has an origin value 0. Wherein, the other summation equations with the index i have an origin value of 1. In order to have all variables for coupling capacitance Ci, threshold length Thri of a segment i, and the spacing SPCi between the segment i of the wiring track structures in sync, the first coupling capacitance designator C is C0, the first threshold length Thr is Thr1 and the first spacing SPC is SPC1. This it makes the increment i equal to (i−1) for the coupling capacitance C calculations per segment. An example is shown below for segment i number 1:

$$Thr1 = \frac{Lt*1}{\frac{n*(n+1)}{2}} \quad C0 = \frac{Ct*(n-0)}{\frac{n*(n+1)}{2}} \quad spc1 = \frac{Thr1*Mtck*\varepsilon}{C0}$$

The maximum parallel common run length Thri is then determined by the equation:

$$Thri = \frac{Lt*i}{\frac{n*(n+1)}{2}}$$

Where:
Thri is the threshold length of a segment i of the wiring track structures 300;
Lt is the length of the wiring track structures 300 and 305; and
i is the number of the segment in the wiring track structure 300; and
n is the number of segments i in the wiring track structures 300.

The spacings Spci for each of the segments i of the wiring track structures 300 and 305 is calculated by the equation:

$$SPCi = \frac{Thri*Mtck*\varepsilon}{C_{i-1}}$$

Where:
SPCi is the spacing of the segment i of the wiring track structures 300 and 305;
Thri is the threshold length of a segment i of the wiring track structures 300;
Mtck is the thickness of the wiring track structures 300 and 305;
E is the permittivity of the insulating layer between the adjacent wiring track structures 300 and 305; and
$C_{(i-1)}$ is the coupling capacitances for each segment i of each of the wiring track structures 300a and 305.

The non-horizontal radial spacings SPChi between wiring track structures 300b and 305 of other metal stack layers calculated by the equation:

$$SPChi = \sqrt{ri^2 - H^2}$$

Where:
SPChi is the spacing of the segment i of the wiring track structures 300b and 305;
ri is the non-horizontal (radial) spacing between the wiring track structures 300b and 305; and
H is the height between the first layer of the quiet wiring track structures 305 on the first wiring track layer and the wiring track structures 300b on a third wiring track layer.

Figure 6:
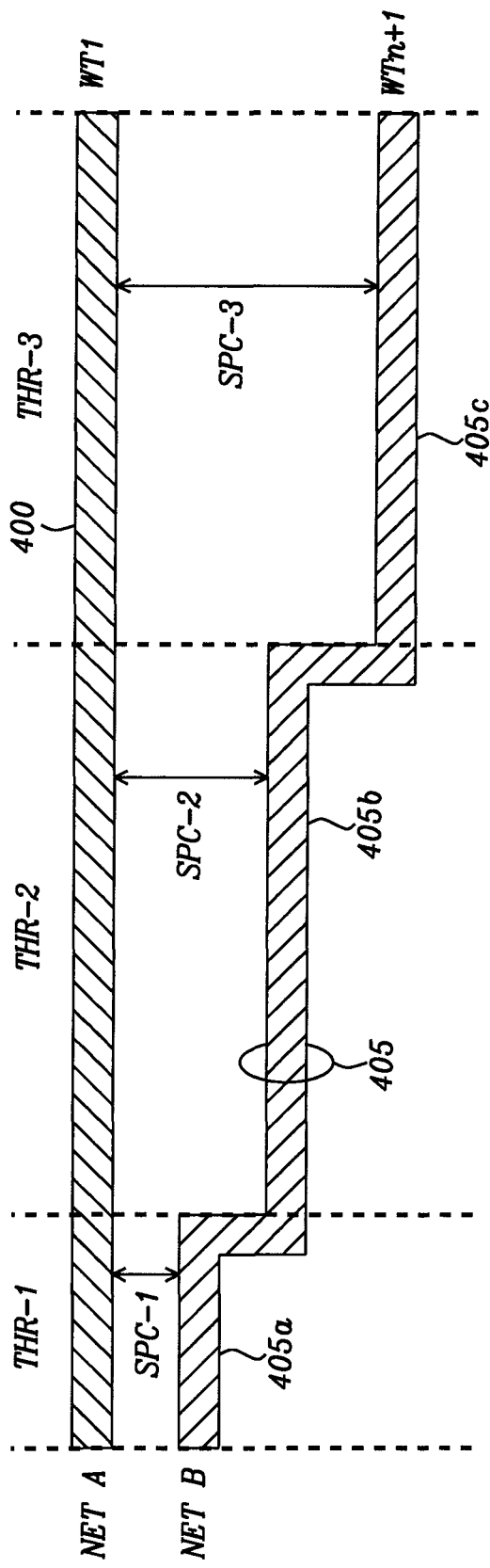
FIG. 6 is a diagram of two wiring track structures illustrating that coupling control is achieved with a set of multiple length threshold lengths and spacings of this disclosure.

FIG. 6 is a diagram of two wiring track structures 400 and 405 illustrating that coupling control is achieved with a set of multiple sized segments 405a, 405b, 405c, and spacings SPC-1, SPC-2, and SPC-3 of this disclosure. The wiring track structure 400 is a one segment wiring track structure WT1, and the wiring track structure 405 is a multiple segment wiring track structure WTn+1. Each of the threshold lengths of the segments 405a, 405b, 405c is determined by the equation $$Thri = \frac{Lt * i}{\frac{n*(n+1)}{2}}$$

Where:
Thri is the threshold length of a segments 405a, 405b, 405c of the wiring track segments 405;
Lt is the total length of the wiring track structures 400 and 405;
i is the number designation of each of the segments 405a, 405b, 405c; and
n is the number of segments 405a, 405b, 405c in the wiring track structure 405.

The space Spci between the wiring track structures 400 and 405 and is determined by the equation:

$$SPCi = \frac{Thri * Mtck * \varepsilon}{C_{i-1}}$$

Where:
SPCi is the spacing of the segments 405a, 405b, 405c of the wiring track structures 400 and 405;
i is the number designation of each of the segments 405a, 405b, 405c;
Thri is the threshold length of one segment 405a, 405b, 405c of the wiring track structures 405;
Mtck is the thickness of the wiring track structures 400 and 405;
$\varepsilon$ is the permittivity of the insulating layer between the adjacent wiring track structures 400 and 405; and
$C_{(i-1)}$ is the coupling capacitances for each segment i of each of the wiring track structures 400 and 405.

The coupling control, as illustrated, defines a spacing Spci routing rule in conjunction with the parallel common run length Lt of wiring track structures 400 and 405. The dependency on the segment length threshold Thri determines the spacing value spci applied between the wiring track 400 and the wiring track structures 405a, 405b, 405c.

Figures 7A, 7B:
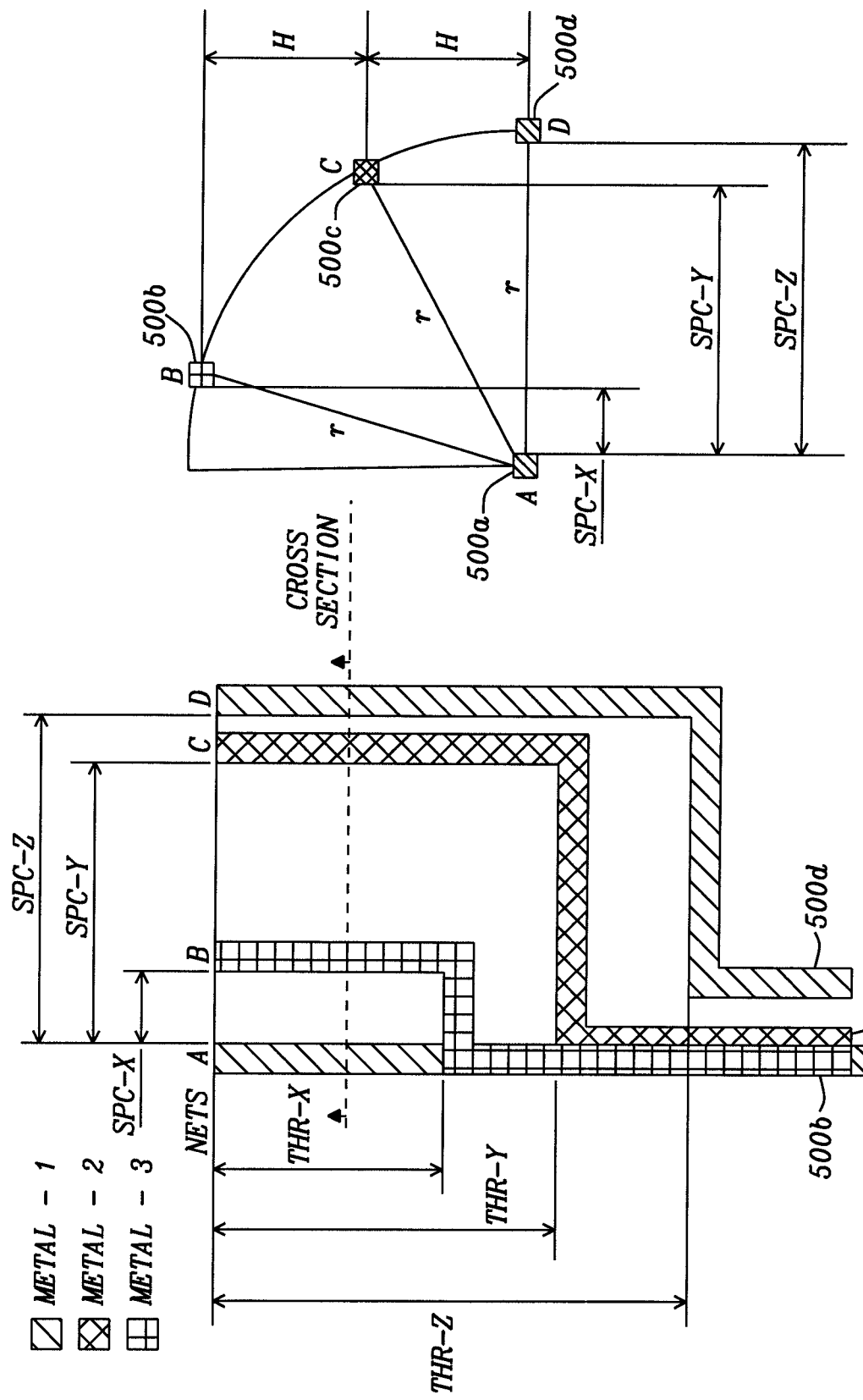
FIGS. 7A and 7B is a diagram of multiple wiring track structures illustrating the horizontal spacing and threshold rules of this disclosure.

FIGS. 7A and 7B are diagrams of multiple wiring track structures 500a, 500b, 500c, and 500d illustrate the horizontal spacing SPCX, SPCY, and SPCZ and segment length threshold rules THRX, THRY, and THRX of this disclosure. The wiring track structure 500a is a first level metal track structure (Metal-1) having no segments and representing a quiet wiring track structure designated NET A. The wiring track structure 500b is a third level metal track structure (Metal-3) having two segments and representing an active noise wiring track structure designated NET B. The wiring track structure 500c is a second level metal track structure (Metal-2) having two segments and representing an active noise wiring track structure designated NET C. The wiring track structure 500d is a first level metal track structure (Metal-1) having two segments and representing an active noise wiring track structure designated NET D.

The segment length threshold THRX of the wiring track structure 500b is calculated as above. The horizontal spacing SPCX of the wiring track structure 500b is similarly is then calculated as above from the segment length threshold THRX. The segment length threshold THRY of the wiring track structure 500c is calculated as above. The horizontal spacing SPCY of the wiring track structure 500c is similarly is then calculated as above from the segment length threshold THRY. The segment length threshold THRZ of the wiring track structure 500d is calculated as above. The horizontal spacing SPCZ of the wiring track structure 500d is similarly is then calculated as above from the segment length threshold THRZ.

The vertical distance between the multiple wiring track structures 500a, 500b, 500c, and 500d is determined by the distance H that is dictated by the technology processing rules 155 of FIG. 2.

The radial distance r is determined by the equation:

$$r = \sqrt{SPC_i^2 + H_i^2}$$

Where:
r is a radial distance from the wiring track structure 500a to each of the wiring track structures 500b, 500c, and 500d.
$SPC_i$ is the horizontal space from the wiring track structure 500a to each of the wiring track structures 500b, 500c, and 500d.
His the distance between layer land the first level metal track structure (Metal-1).

The cross-section of FIG. 7B illustrates how the horizontal spacing SPCX, SPCY, and SPCZ and segment length threshold rules THRX, THRY, and THRX are scaled through the multiple level metal track structure (Metal-1, Metal-2, and Metal-3) combinations. As further apart vertically the multiple level metal track structure (Metal-1, Metal-2, and Metal-3) combinations get, the smaller it takes the horizontal spacing SPCX, SPCY, and SPCZ and bigger the segment length thresholds THRX, THRY, and THRX to have the same capacitive coupling compared to a same level metal track structure (Metal-1 to Metal-1) combinations, which has the radial clearance the same as the horizontal spacing SPCZ for same level metal track structures 500a and 500d.

FIG. 8A is a table that illustrates the specifications to calculate the spacing rules for an example using the structure of FIGS. 7A and 7B. In this example, FIG. 8A provides exemplary specification from the process technology rules database 155 of FIG. 2. This data is used to calculate the horizontal spacing SPCX from the first level metal wiring track structure 500a to the third level metal wiring track structure 500b. The data used to calculate the horizontal spacing SPCY from the first level metal wiring track structure 500a to the second level metal wiring track structure 500c. Also, the data used to calculate the horizontal spacing SPCZ from the first level metal wiring track structure 500a to the first level metal wiring track structures 500d. The calculations are those described above for FIGS. 7A and 7B. In the table of FIG. 8B the counting variable i for the maximum number of divisions n that the total length Lt is divided. Each of the counting variables i are employed to calculate the threshold segment lengths Thr of the noise generating wiring tracks 500b, 500c, 500d. From the threshold segment lengths Thr, the capacitance C for each of the threshold segment lengths Thr is calculated. The values for the horizontal spacing SPCX, SPCY, and SPCZ are then determined from the above equations.

The horizontal space reduction between the horizontal spacing SPCZ from the first level metal wiring track structure 500a and the horizontal spacing SPCY from the first level metal wiring track structure 500a and the horizontal space reduction between the horizontal spacing SPCZ from the first level metal wiring track structure 500a and the horizontal spacing SPCX from the first level metal wiring track structure 500a is determined as a percentage reduction of the horizontal spacing SPCZ.

The percentage reduction of the horizontal space SPCY between the first level metal wiring track structure 500a and the second level metal wiring track structure 500c, and the horizontal space SPCZ between the first level metal wiring track structure 500a and the first level metal wiring track structure 500d is determined by the equation:

$$SPCY:SPCZ[\%] = \left(1 - \left(\frac{SPCY}{SPCZ}\right)\right) * 100$$

The percentage reduction of the horizontal space SPCX between the first level metal wiring track structure 500a and the third level metal wiring track structure 500b, and the horizontal space SPCZ between the first level metal wiring track structure 500a and the first level metal wiring track structure 500d is determined by the equation:

$$SPCX:SPCZ[\%] = \left(1 - \left(\frac{SPCX}{SPCZ}\right)\right) * 100$$

When the horizontal spaces SPCY or SPCX are equal to the horizontal space SPCZ, the percentage reduction is 0% and the radial distance r is much, much greater than the horizontal distance H. When the horizontal spaces SPCY or SPCX are less than the horizontal space SPCZ, the percentage reduction is greater than 0% and the radial distance r is less than the horizontal distance H. When the horizontal spaces SPCY or SPCX are equal zero (0), the percentage reduction is 100% and the radial distance r is equal to the horizontal distance H.

Figure 9A:
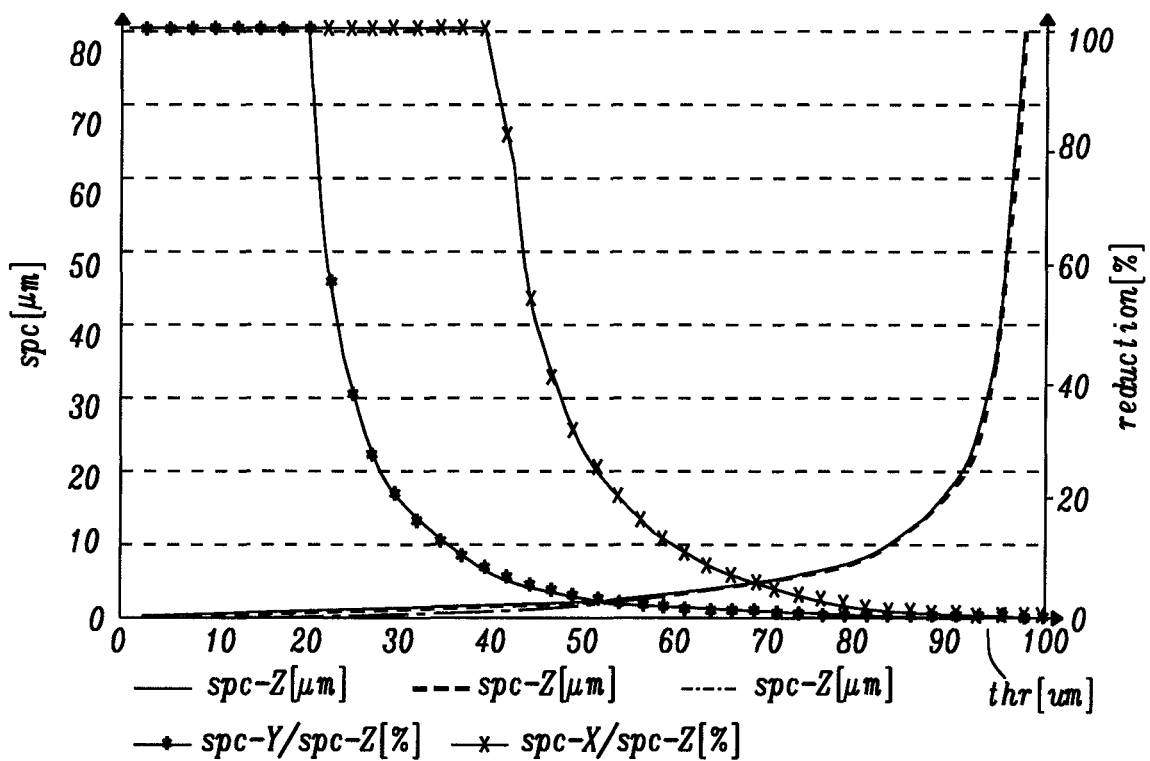
FIG. 9A is a plot of the results with the curves for spacing sizes versus threshold length and its effective reduction of this disclosure.
Figure 9B:
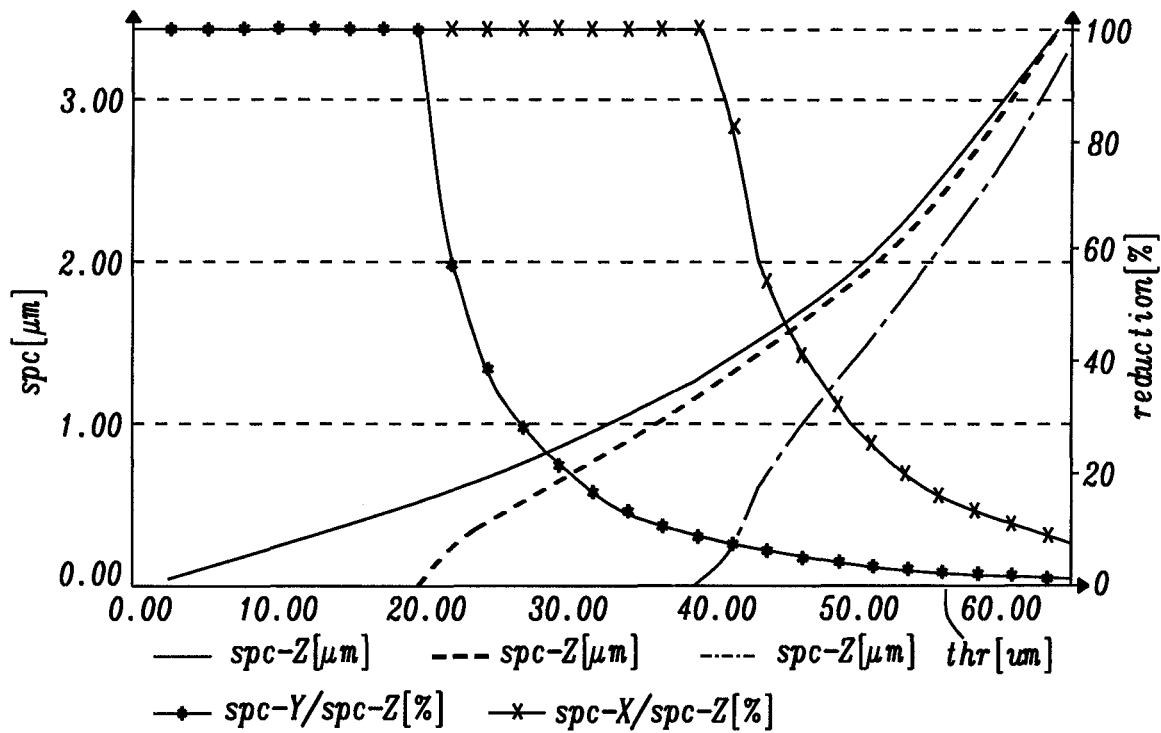
FIG. 9B is a plot of the results with the curves for spacing sizes versus threshold length and its effective reduction of this disclosure.

FIG. 9A is a plot of the results with the curves for spacing sizes versus threshold length and its effective reduction of this disclosure. FIG. 9B is a plot of the results with the curves for spacing sizes versus threshold length and its effective reduction spacing behavior in the range where the reduction is more pronounced of this disclosure. FIGS. 9A and 9B summarize the results of the table of FIG. 8B. The curves demonstrate for spacings per threshold length land its effective reduction. These curves are solely for summarizing the space reduction results, through the metal stack layer combinations, from the calculations above, consequently illustrating, in form of a graph, how the reduction is performed with the various threshold lengths and maximum capacitance per segment. These graphs are not specifically used in the generating of the three dimensional coupling control rules.

Figure 10:
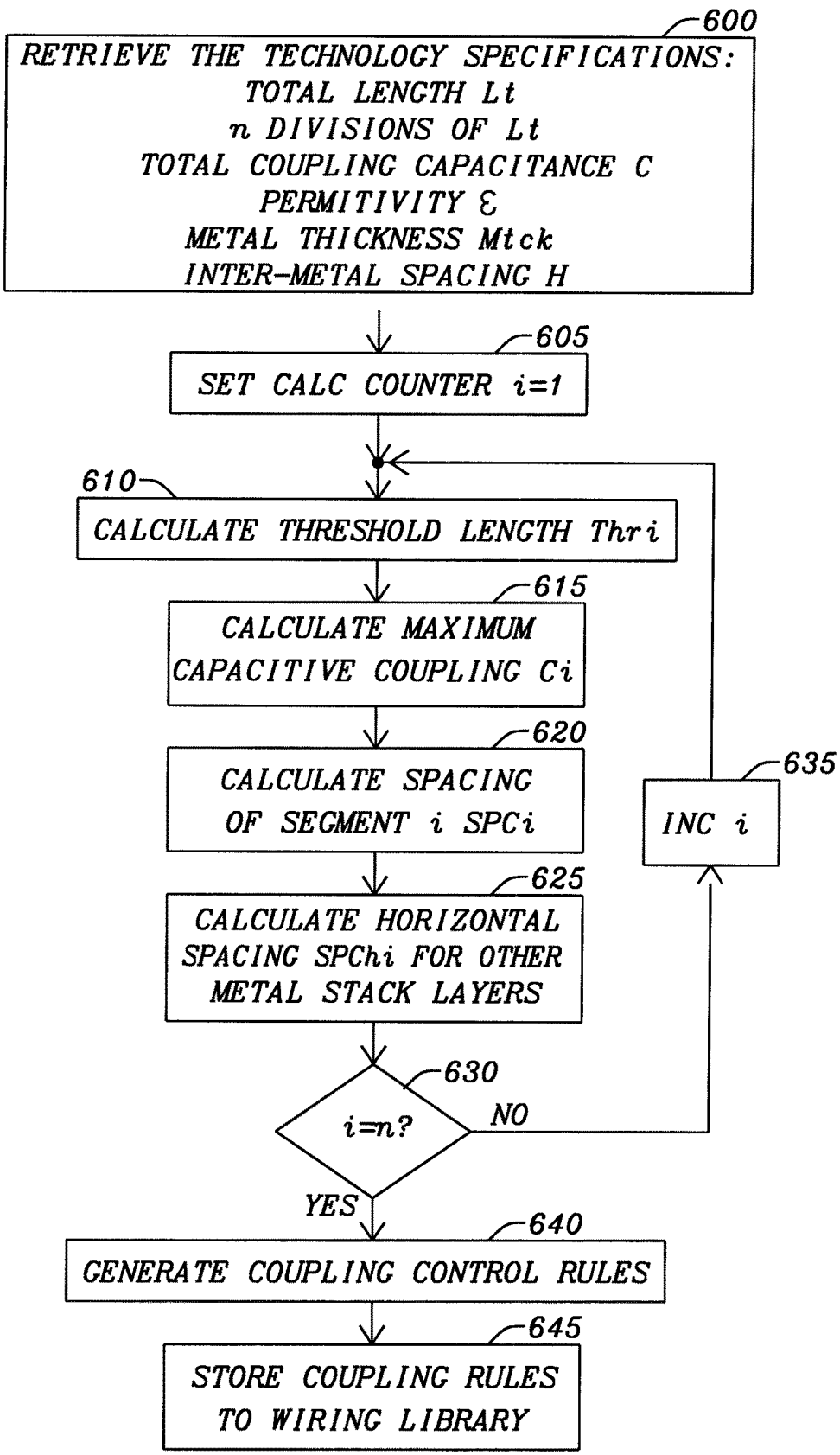
FIG. 10 is a flowchart of a method of generating capacitive coupling control and routing rules for multiple wiring tracks of this disclosure.

FIG. 10 is a flowchart of a method of generating capacitive coupling control and routing rules for multiple wiring tracks of this disclosure. The method begins with retrieving (Box 600) the technology specifications, as described in FIG. 8A and including the total length Lt, the number n of divisions of total length Lt, the total coupling capacitance C the permittivity e, the metal thickness MTCK, and the inter-metal layer spacing H A counting variable i is initialized (Box 605) to one (1) for iterating the method for the number n of divisions of Lt. The threshold length Thri of a segment i of the wiring track structures is calculated (Box 610). The maximum capacitive coupling Ci for each segment i of the wiring track structures is calculated (Box 615). The spacing spci between the segment i of the wiring track structures and the adjacent wiring track structure is calculated (Box 620). The horizontal spacings SPChi of the segment i of the wiring track structures and the adjacent wiring track structure on other wiring layers is calculated (Box 625).

The counting variable i is compared (Box 630) with the number n of the divisions of the total length Lt. If the c counting variable i is not equal to the number of divisions n of total length Lt, the counting variable i is incremented (Box 635) and the steps of (Box 610), (Box 615), (Box 620) and (Box 625) are iterated. When the counting variable i is equal to the number of divisions n of total length Lt, the capacitive coupling rules are generated as digitized program code (Box 640) and the digitized program code of the coupling rules is stored (Box 645) in a non-transitory data storage device that retains the wiring rules library 185 of FIG. 2.

Figure 11A:
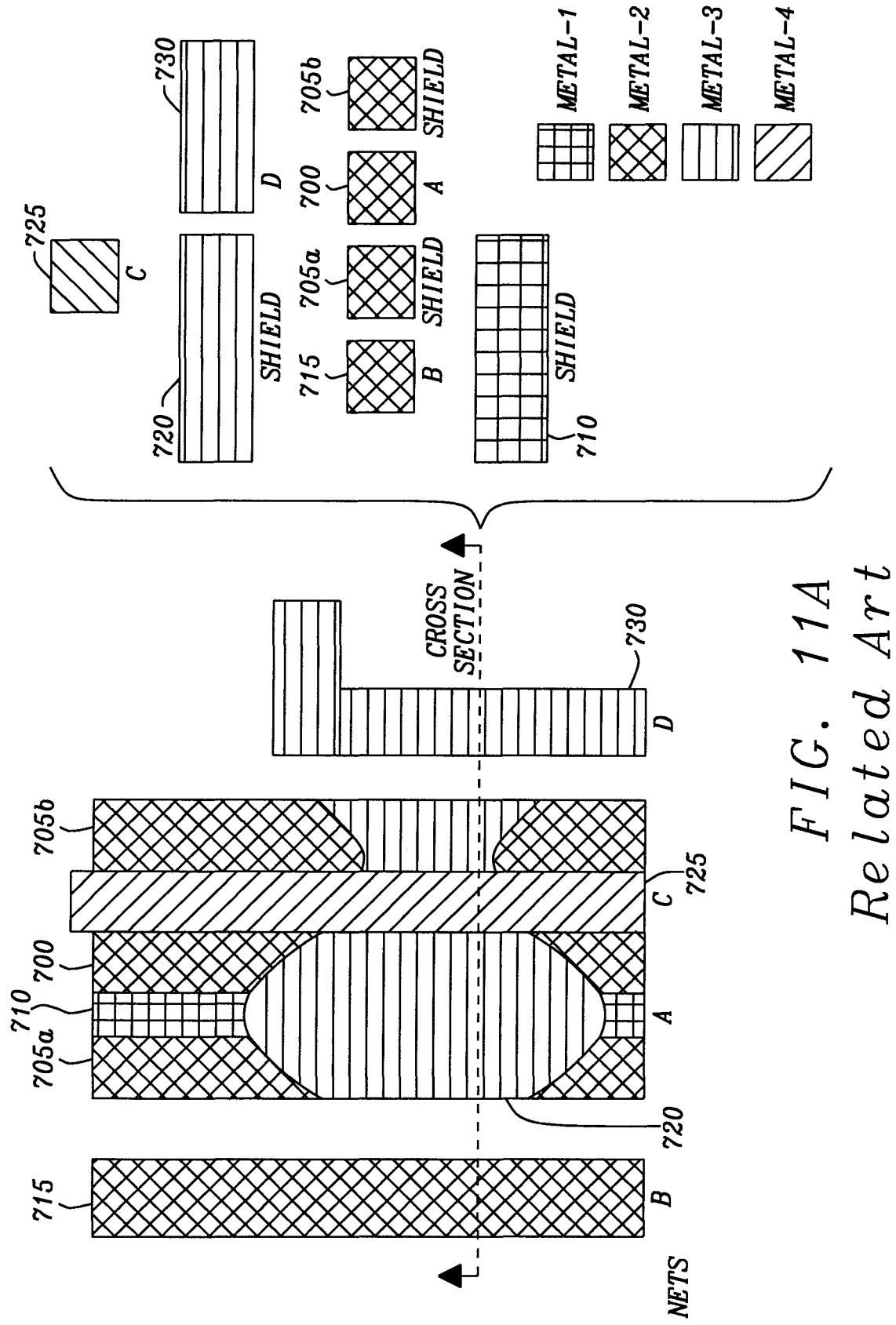
FIGS. 11A and 11B are diagrams of a second example multiple active noise wiring track structures and one quiet wiring track structure with shielding of the related art.
Figure 11B:
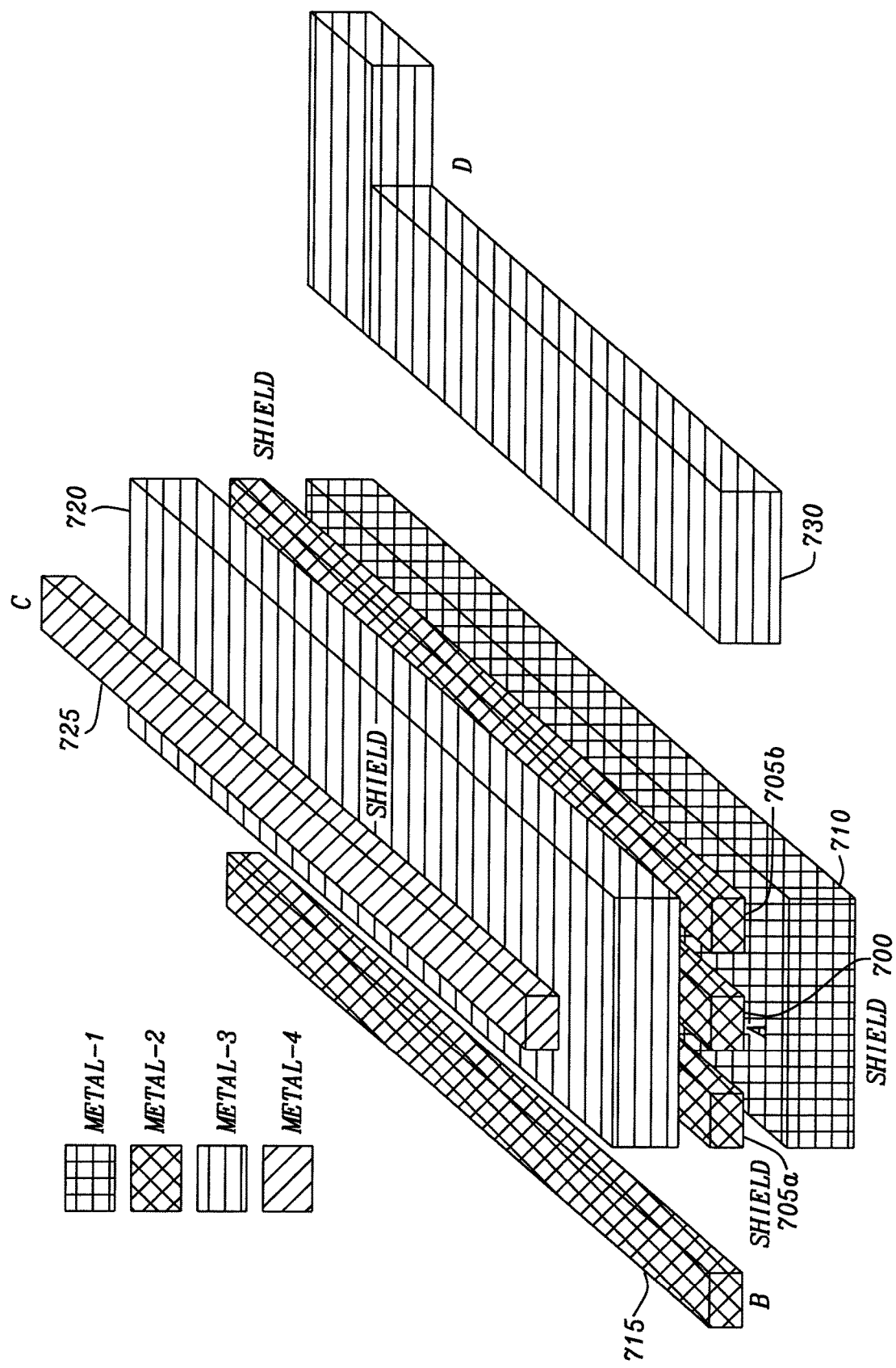

A computer system as shown in FIG. 1b is configured for retaining electronic design automation system program code 105 retained by a non-transitory data storage device 160 that when decoded and executed on the central processor 50 of the computer system 10 performs the method for controlling crosstalk between a plurality of noise generating wiring tracks and at least one quiet wiring track by determining a maximum coupling capacitance allowed between one active wiring track and one quiet wiring that is placed on the same wiring track layer as described above in FIG. 10. The wiring rules as generated above are extracted from the wiring rules library 185 and FIGS. 11A and 11B are diagrams of an example of one quiet wiring track structure 700 with shield wiring tracks 705a, 705b, 710, and 720 and multiple active noise wiring track structures 715, 725, and 730 of the related art. The quiet wiring track structure 700 is placed on a second level metal. The shielding wiring tracks 705a and 705b are similarly second level metal and are adjacent to the quiet wiring track structure 700. The active noise wiring track structures 715 is placed on the second level metal and on the opposite side of the shield wiring tracks 705a from the quiet wiring track structure 700. The shield wiring track structure 710 is placed on the first level metal and beneath the quiet wiring track structure 700. The shield wiring track structure 710 is approximately the width of the combination of the quiet wiring track structure 700 and the two shield wiring track 705a and 705b. The shield wiring track structure 720 is placed on the third level metal and above the quiet wiring track structure 700. The shield wiring track structure 720 is also approximately the width of the combination of the quiet wiring track structure 700 and the two shield wiring tracks 705a and 705b and approximately the same length. The active noise wiring track 730 is on the third level metal and is isolated from the quiet wiring track structure 700 by the shielding wiring tracks 705b and 720. The active noise wiring track 725 is on the fourth level metal and is isolated from the quiet wiring track structure 700 by the shield wiring track 705b.

The coaxial shielding structures, as formed by the quiet wiring track structure 700 with shield wiring tracks 705a, 705b, 710, and 720, are commonly required to protect critical signal routing against noisy interference from parallel and adjacent metal tracks. The shielding structure requires that the three sequential metal layers are routed with the same routing orientation, to avoid crosstalk interference on the quiet wiring track structure 700.

Generally, auto-routing algorithms have the principle of routing orientation to be defined according to vertical and horizontal tracks, defined explicitly for the metal layer stack, which means that odd metal layers from the stack have one orientation and even layers have an orientation that is orthogonal to the odd layers. That is the odd layers 1, 3, 5, etc. are in a first direction and the even layers 2, 4, 6, etc. will be in a second direction that is at a right angle to the first direction. The coaxial wiring track structure of FIGS. 11A and 11B violates the standard construction of the metal routing orientation. Therefore, this wiring structure of FIGS. 11A and 11B is not a practical approach for protecting auto-routed critical signals.

Figure 12:
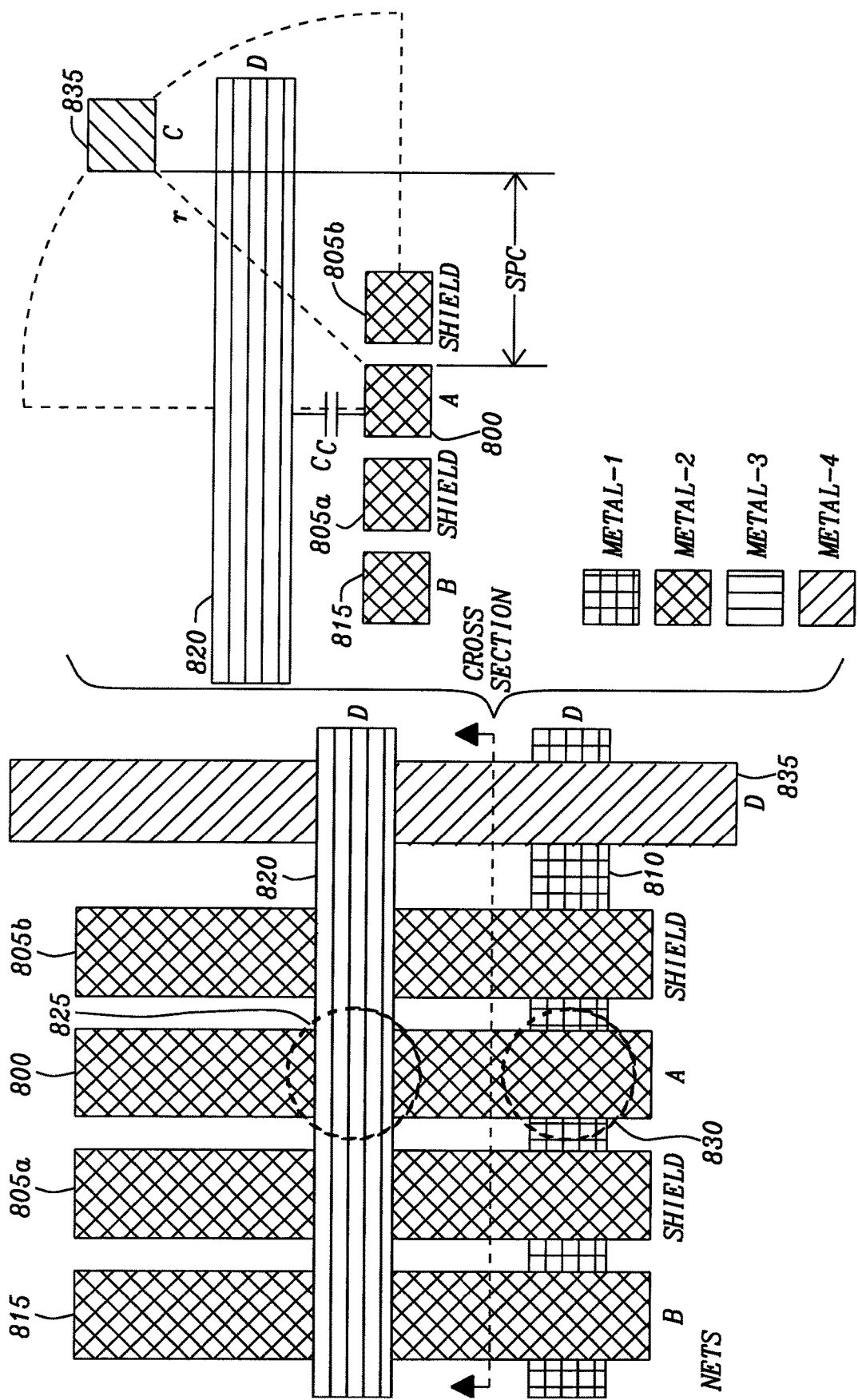
FIG. 12 is a diagram of multiple wiring track structures with shielding illustrating the horizontal spacing and threshold rules of this disclosure.

FIG. 12 is a diagram an example of one quiet wiring track structure 800 with shield wiring tracks 805a, 805b, and multiple active noise wiring track structures 810, 815, 820, and 835 of this disclosure. The quiet wiring track structure 800 is placed on a second level metal. The shielding wiring tracks 805a and 805b are similarly second level metal and are adjacent to the quiet wiring track structure 800. The active noise wiring track structure 815 is placed on the second level metal and on the opposite side of the shield wiring tracks 805a from the quiet wiring track structure 800. The active noise wiring track structure 810 is placed on the first level metal and orthogonal to the quiet wiring track structure 800. The active noise wiring track structure 820 is placed on the third level metal and orthogonal to the quiet wiring track structure 800. The active noise wiring track 835 is on the fourth level metal and is parallel to the quiet wiring track structure 800.

The coupling capacitor 825 formed by the intersection 825 of the quiet wiring track structure 800 and the active noise wiring track structure 820 has a capacitance value of approximately 0.1 fF. Similarly, the coupling capacitor (not shown) formed by the intersection 830 of the quiet wiring track structure 800 and the active noise wiring track structure 810 has a capacitance value of approximately 0.1 fF.

As is shown, a combination of shielding and the three-dimensional coupling control rules can effectively achieve auto-routing shielding nets together with coupling control for adjacent metal layers. The combination of shielding and three-dimensional coupling control rules as illustrated in FIG. 12 has the quiet wiring track structure 800 in parallel shield wiring tracks 805a, 805b to avoid any coupling to the same metal layer tracks. Consequently, this shielding structure compatibility with auto-routing orientation occurs because the wiring channels on the first and third wiring layers that are orthogonal to the wiring routing of the second wiring and are not obstructed for routing. The capacitive coupling for the parallel active noise wiring track 835 on the fourth level metal is controlled with the three-dimensional coupling rules by taking advantage of the metal layer stack height and control the radial distance r the spacing SPC between the metal layer track combinations independently. The allowed crossing of adjacent metal tracks to the quiet wiring track structure 800 on the second metal level and the active noise wiring track structures 810 on the first metal level and crossing of adjacent metal tracks to the quiet wiring track structure 800 on the second metal level and the active noise wiring track structures 820 on the third metal level. The coupling capacitance 830 and 820 have a neglectable effect (0.1 fF as described above) due to the relatively small area created by the cross of both metal tracks.

While this disclosure has been particularly shown and described with reference to the preferred embodiments thereof, it will be understood by those skilled in the art that various changes in form and details may be made without departing from the spirit and scope of the disclosure.

What is claimed is:

1. An integrated circuit comprising:
   a plurality of active metal wiring track structures on at least one metal wiring level of the integrated circuit wherein the plurality of active metal wiring track structures carry noise generating signals; and
   at least one quiet wiring track structure on one of the at least one metal wiring level of the integrated circuit carrying a voltage or signal susceptible to the noise generated by the noise generating signals;
   wherein each of the plurality of active metal wiring track structures is formed as segments that have various distances between each of the plurality of active metal wiring track structures on at least one wiring level;
   wherein each of the plurality of metal wiring track structures of the at least one metal wiring level forms a stair step or ladder structure that controls individually the spacing applied between multiple active noise wiring track structures and one quiet wiring track structure thus achieving a three-dimensional control of a noise coupling capacitance;
   wherein the individual common parallel run length threshold controlling the spacing is applied to the active noise wiring track structures length;
   wherein the stair-step or ladder structure takes advantage of a stack height of the metal layer and controls the spacing between the active noise wiring track structure combinations independently, for controlling noise coupling to the at least one quiet wiring track structure.

2. The integrated circuit of claim 1 wherein the spacing between the segments of the plurality of active noise wiring track structures and the at least one quiet wiring track structure is determined by a maximum coupling capacitance allowed between one and one quiet wiring that is placed on the same wiring track layer.

3. The integrated circuit of claim 2 wherein the maximum coupling capacitance allowed between one of the plurality of active noise wiring track structures and the at least one quiet wiring track structure is determined by a maximum voltage ripple allowed to present on the at least one quiet wiring track structure, operational frequency and other specifications of circuit topology of the integrated circuit.

4. The integrated circuit of claim 3 wherein a parallel common run length is ascertained, and the number of threshold segment lengths into which the maximum parallel common run length is divided is established from the maximum coupling capacitance.

5. The integrated circuit of claim 4, wherein the parallel common run length and a total number of divisions is defined per process design specifications.

6. The integrated circuit of claim 4 wherein a space between the at least one quiet wiring track structure and each of the plurality of active noise wiring track structures is dependent upon the maximum capacitive coupling and the number of threshold lengths of each of the plurality of wiring tracks.

7. The integrated circuit of claim 6, wherein the individual threshold segment lengths are determined by the equation:

$$Thri = \frac{Lt * i}{\frac{n*(n+1)}{2}}$$

Where:
Thri is the threshold length of a segment i of the threshold lengths of the wiring track length;
Lt is the total length of the noise generating wiring tracks and the quiet wiring track; and
n is the number of threshold length segments of the plurality active noise wiring track structures and the at least one quiet wiring track structure.

8. The integrated circuit of claim 7, wherein the coupling capacitance for each threshold length is determined by the equation:

$$Ci = \frac{Ct*(n-i)}{\frac{n*(n+1)}{2}}$$

Where:
Ci is the coupling capacitance of an individual threshold length of one of the plurality of active noise wiring track structures and the at least one quiet wiring track structure;
Ct is the maximum coupling capacitance allowed for the total length of the plurality of active noise wiring track structures and the at least one quiet wiring track structure; and
n is the number of threshold length segments of the plurality of active noise wiring track structures and the at least one quiet wiring track structure.

9. The integrated circuit of claim 8, wherein the space between the plurality of active noise wiring track structures and the at least one quiet wiring track structure is determined by the equation:

$$SPCi = \frac{Thri*Mtck*\varepsilon}{Ci}$$

Where:
SPCi is the space between the plurality of active noise wiring track structures and at least one quiet wiring track structure;
Thri is the threshold length of a segment i of the threshold lengths of the wiring track length;
Mtck is the thickness of the plurality of active noise wiring track structures and the at least one quiet wiring track structure;
$\varepsilon$ is the permittivity of the inter-metal dielectric between the plurality of active noise wiring track structures and the at least one quiet wiring track structure; and
Ci is the coupling capacitance of an individual threshold length of one of the plurality of active noise wiring track structures and the at least one quiet wiring track structure.

10. The integrated circuit of claim 8 wherein a horizontal spacing between one of the plurality of active noise wiring track structures and the at least one quiet wiring track structure one each of the wiring track layers is determined by the equation:

$$SPChi = \sqrt{ri^2 - h^2}$$

Where:
SPChi is the horizontal spacing between the quiet wiring track and one of the plurality of noise generating wiring tracks;
ri is the radial distance between the quiet wiring track and one of the plurality of noise generating wiring tracks;
i is the number designation of each of the segments of the active metal wiring track structures; and
h is the vertical distance between the metal stack layer combinations of the wiring tracks.

11. A method for generating capacitive coupling control and routing rules for a plurality of active noise wiring track structures and at least one quiet wiring track structure placed upon an integrated circuit, wherein the method comprises the steps of:
retrieving technology specifications for fabrication of the integrated circuit from a processing rules database in a computer system;
initializing a counting variable for iterating the method for the number of threshold length segments of the plurality active noise wiring track structures and the at least one quiet wiring track structure;
a) calculating the threshold length of one threshold length segment of one of the plurality active noise wiring track structures;
b) calculating the maximum capacitive coupling between the one threshold length segment of the one of the plurality active noise wiring track structures and the at least one quiet wiring track structure; and
c) calculating a spacing between the one threshold length segment of the one of the plurality active noise wiring track structures and the at least one quiet wiring track structure; and
d) calculating the horizontal spacing of the one threshold length segment of the one of the plurality active noise wiring track structures and the at least one quiet wiring track structure on other wiring layers;
e) determining if the counting variable is not equal to the number of divisions of total length;
when the counting variable is not equal to the number of divisions of total length, incrementing the counting variable and iterating the steps of a), b), c), d) and e);
when the counting variable is equal to the number of divisions of total length, generating the capacitive coupling rules as digitized program code and storing the digitized program code of the coupling rules in a non-transitory machine readable information storage medium that retains a wiring rules library for use in a computer system executing an auto-routing program to create the plurality of active noise wiring track structures and the at least one quiet wiring track structure on the integrated circuit.

12. The method of claim 11 wherein the technology specifications include the total length of the plurality of active noise wiring track structures and the at least one quiet wiring track structure, the number of divisions of total length of the plurality of active noise wiring track structures and the at least one quiet wiring track structure, the total coupling capacitance between one of the plurality of active noise wiring track structures and the at least one quiet wiring track structure, a permittivity of an inter-metal dielectric, a metal thickness of the plurality of active noise wiring track structures and the at least one quiet wiring track structure, and the inter-metal layer spacing between the plurality of active noise wiring track structures and the at least one quiet wiring track structure.

13. The method of claim 12 wherein the maximum coupling capacitance allowed between one of the plurality of active noise wiring track structures and the at least one quiet wiring track structure is determined by a maximum voltage ripple allowed to present on the at least one quiet wiring track structure, operational frequency and other specifications of circuit topology of the integrated circuit.

14. The method of claim 13, wherein a parallel common run length is ascertained, and the number of threshold segment lengths into which the maximum parallel common run length is divided is established from the maximum coupling capacitance.

15. The method of claim 14, wherein the parallel common run length and total number of divisions are defined per process design specifications.

16. The method of claim 14 wherein a space between the at least one quiet wiring track structure and each of the plurality of active noise wiring track structures is dependent upon the maximum capacitive coupling and the number of threshold lengths of each of the plurality of wiring tracks.

17. The method of claim 14, wherein the individual threshold segment lengths are calculated by the equation:

$$Thri = \frac{Lt * i}{\frac{n*(n+1)}{2}}$$

Where:
Thri is the threshold length of a segment i of the threshold lengths of the wiring track length;
Lt is the total length of the noise generating wiring tracks and the quiet wiring track; and
n is the number of threshold length segments of the plurality active noise wiring track structures and the at least one quiet wiring track structure.

18. The method of claim 17, wherein the coupling capacitance for each threshold length is calculated by the equation:

$$Ci = \frac{Ct*(n-i)}{\frac{n*(n+1)}{2}}$$

Where:
Ci is the coupling capacitance of an individual threshold length of one of the plurality of active noise wiring track structures and the at least one quiet wiring track structure;
Ct is the maximum coupling capacitance allowed for the total length of the plurality of active noise wiring track structures and the at least one quiet wiring track structure; and
n is the number of threshold length segments of the plurality of active noise wiring track structures and the at least one quiet wiring track structure.

19. The method of claim 18, wherein the space between the plurality of active noise wiring track structures and the at least one quiet wiring track structure is calculated by the equation:

$$SPCi = \frac{Thri*Mtck*\varepsilon}{Ci}$$

Where:
SPCi is the space between the plurality of active noise wiring track structures and the at least one quiet wiring track structure;
Thri is the threshold length of a segment i of the threshold lengths of the wiring track length;
Mtck is the thickness of the plurality of active noise wiring track structures and the at least one quiet wiring track structure;
$\varepsilon$ is the permittivity of the inter-metal dielectric between the plurality of active noise wiring track structures and the at least one quiet wiring track structure; and
Ci is the coupling capacitance of an individual threshold length of one of the plurality of active noise wiring track structures and the at least one quiet wiring track structure.

20. The method of claim 19 wherein a horizontal spacing between one of the plurality of active noise wiring track structures and the at least one quiet wiring track structure one each of the wiring track layers is calculated by the equation:

$$SPChi = \sqrt{ri^2 - h^2}$$

Where:
SPChi is the horizontal spacing between the quiet wiring track and one of the plurality of noise generating wiring tracks;
ri is the radial distance between the quiet wiring track and one of the plurality of noise generating wiring tracks;
i is the number designation of each of the segments of the active metal wiring track structures; and
h is the vertical distance between the metal stack layer combinations of the wiring tracks.

21. A non-transitory machine readable information storage medium configured for retaining program code recorded upon the non-transitory machine readable information storage medium that when retrieved is decoded and executed on a computer system performs a method for generating capacitive coupling control and routing rules for a plurality of active noise wiring track structures and at least one quiet wiring track structure placed upon an integrated circuit, wherein the method comprises the steps of:
retrieving technology specifications for fabrication of the integrated circuit from a processing rules database in a computer system;
initializing a counting variable for iterating the method for the number of threshold length segments of the plurality active noise wiring track structures and the at least one quiet wiring track structure;
a) calculating the threshold length of one threshold length segment of one of the plurality active noise wiring track structures;
b) calculating the maximum capacitive coupling between the one threshold length segment of the one of the plurality active noise wiring track structures and the at least one quiet wiring track structure; and
c) calculating a spacing between the one threshold length segment of the one of the plurality active noise wiring track structures and the at least one quiet wiring track structure; and
d) calculating the horizontal spacing of the one threshold length segment of the one of the plurality active noise wiring track structures and the at least one quiet wiring track structure on other wiring layers;

e) determining if the counting variable is not equal to the number of divisions of total length;
when the counting variable is not equal to the number of divisions of total length, incrementing the counting variable and iterating the steps of a), b), c), d), and e);
when the counting variable is equal to the number of divisions of total length, generating the capacitive coupling rules as digitized program code and storing the digitized program code of the coupling rules in a non-transitory machine readable information storage medium that retains a wiring rules library for use in a computer system executing an auto-routing program to create the plurality of active noise wiring track structures and the at least one quiet wiring track structure on the integrated circuit.

22. The non-transitory machine readable information storage medium of claim 21 wherein the technology specifications include the total length of the plurality of active noise wiring track structures and the at least one quiet wiring track structure, the number of divisions of total length of the plurality of active noise wiring track structures and the at least one quiet wiring track structure, the total coupling capacitance between one of the plurality of active noise wiring track structures and the at least one quiet wiring track structure, a permittivity of an inter-metal dielectric, a metal thickness of the plurality of active noise wiring track structures and the at least one quiet wiring track structure, and the inter-metal layer spacing between the plurality of active noise wiring track structures and the at least one quiet wiring track structure.

23. The method of claim 22 wherein the maximum coupling capacitance allowed between one of the plurality of active noise wiring track structures and the at least one quiet wiring track structure is determined by a maximum voltage ripple allowed to present on the at least one quiet wiring track structure, operational frequency and other specifications of circuit topology of the integrated circuit.

24. The method of claim 23, wherein a parallel common run length is ascertained and the number of threshold segment lengths into which the maximum parallel common run length is divided, is established from the maximum coupling capacitance.

25. The method of claim 24, wherein the parallel common run length and the total number of divisions are defined per process design specifications.

26. The method of claim 24 wherein a space between the at least one quiet wiring track structure and each of the plurality of active noise wiring track structures is dependent upon the maximum capacitive coupling and the number of threshold lengths of each of the plurality of wiring tracks.

27. The non-transitory machine readable information storage medium of claim 26, wherein the individual threshold segment lengths are calculated by the equation:

$$Thri = \frac{Lt * i}{\frac{n*(n+1)}{2}}$$

Where:
Thri is the threshold length of a segment i of the threshold lengths of the wiring track length;
Lt is the total length of the noise generating wiring tracks and the quiet wiring track; and
n is the number of threshold length segments of the plurality active noise wiring track structures and the at least one quiet wiring track structure.

28. The non-transitory machine readable information storage medium of claim 27 wherein the coupling capacitance for each individual threshold length is calculated by the equation:

$$Ci = \frac{Ct * (n-i)}{\frac{n*(n+1)}{2}}$$

Where:
Ci is the coupling capacitance of an individual threshold length of one of the plurality of active noise wiring track structures and the at least one quiet wiring track structure;
Ct is the maximum coupling capacitance allowed for the total length of the plurality of active noise wiring track structures and the at least one quiet wiring track structure; and
n is the number of threshold length segments of the plurality of active noise wiring track structures and the at least one quiet wiring track structure.

29. The non-transitory machine readable information storage medium of claim 28, wherein the space between the plurality of active noise wiring track structures and the at least one quiet wiring track structure is calculated by the equation:

$$SPCi = \frac{Thri * Mtck * \varepsilon}{Ci}$$

Where:
SPCi is the space between the plurality of active noise wiring track structures and the at least one quiet wiring track structure;
Thri is the threshold length of a segment i of the threshold lengths of the wiring track length;
Mtck is the thickness of the plurality of active noise wiring track structures and the at least one quiet wiring track structure;
$\varepsilon$ is the permittivity of the inter-metal dielectric between the plurality of active noise wiring track structures and the at least one quiet wiring track structure; and
Ci is the coupling capacitance of an individual threshold length of one of the plurality of active noise wiring track structures and the at least one quiet wiring track structure.

30. The non-transitory machine readable information storage medium of claim 29 wherein a horizontal spacing between one of the plurality of active noise wiring track structures and the at least one quiet wiring track structure one each of the wiring track layers is calculated by the equation:

$$SPChi = \sqrt{ri^2 - h^2}$$

Where:
SPChi is the horizontal spacing between the quiet wiring track and one of the plurality of noise generating wiring tracks;
ri is the radial distance between a quiet wiring track and one of the plurality of noise generating wiring tracks;

i is the number designation of each of the segments of the active metal wiring track structures; and h is the vertical distance between the metal stack layer combinations of the wiring tracks.

31. A computer system comprising a non-transitory machine readable information storage medium that retains program code that when decoded and executed on a processor of the computer system performs a method for controlling crosstalk between a plurality of active noise wiring track structures and at least one quiet wiring track structure wherein the method comprises the steps of:

retrieving technology specifications for fabrication of the integrated circuit from a processing rules database in a computer system;

initializing a counting variable for iterating the method for the number of threshold length segments of the plurality active noise wiring track structures and the at least one quiet wiring track structure;

a) calculating the threshold length of one threshold length segment of one of the plurality active noise wiring track structures;

b) calculating the maximum capacitive coupling between the one threshold length segment of the one of the plurality active noise wiring track structures and the at least one quiet wiring track structure; and c) calculating a spacing between the one threshold length segment of the one of the plurality active noise wiring track structures and the at least one quiet wiring track structure; and d) calculating the horizontal spacing of the one threshold length segment of the one of the plurality active noise wiring track structures and the at least one quiet wiring track structure on other wiring layers;

e) determining if the counting variable is not equal to the number of divisions of total length;

when the counting variable is not equal to the number of divisions of total length, incrementing the counting variable and iterating the steps of a), b), c), d), and e);

when the counting variable is equal to the number of divisions of total length, generating the capacitive coupling rules as digitized program code and storing the digitized program code of the coupling rules in a non-transitory machine readable information storage medium that retains a wiring rules library for use in a computer system executing an auto-routing program to create the plurality of active noise wiring track structures and the at least one quiet wiring track structure on the integrated circuit.

32. The computer system of claim 31 wherein the technology specifications include the total length of the plurality of active noise wiring track structures and the at least one quiet wiring track structure, the number of divisions of total length of the plurality of active noise wiring track structures and the at least one quiet wiring track structure, the total coupling capacitance between one of the plurality of active noise wiring track structures and the at least one quiet wiring track structure, a permittivity an inter-metal dielectric, a metal thickness of the plurality of active noise wiring track structures and the at least one quiet wiring track structure, and the inter-metal layer spacing between the plurality of active noise wiring track structures and the at least one quiet wiring track structure.

33. The computer system of claim 32 wherein the maximum coupling capacitance allowed between one of the plurality of active noise wiring track structures and the at least one quiet wiring track structure is determined by a maximum voltage ripple allowed to present on the at least one quiet wiring track structure, operational frequency and other specifications of circuit topology of the integrated circuit.

34. The computer system of claim 33, wherein a parallel common run length is ascertained, and the number of threshold segment lengths into which the maximum parallel common run length is divided is established from the maximum coupling capacitance.

35. The computer system of claim 34 wherein the parallel common run length and total number of divisions are defined per process design specifications.

36. The computer system of claim 34 wherein a space between the at least one quiet wiring track structure and each of the plurality of active noise wiring track structures is dependent upon the maximum capacitive coupling and the number of threshold lengths of each of the plurality of wiring tracks.

37. The computer system of claim 36 wherein the individual threshold segment lengths are calculated by the equation:

$$Thri = \frac{Lt * i}{\frac{n*(n+1)}{2}}$$

Where:

Thri is the threshold length of a segment i of the threshold lengths of the wiring track length;

Lt is the total length of the noise generating wiring tracks and the quiet wiring track; and n is the number of threshold length segments of the plurality active noise wiring track structures and the at least one quiet wiring track structure.

38. The computer system of claim 37 wherein the coupling capacitance for each individual threshold length is calculated by the equation:

$$Ci = \frac{Ct*(n-i)}{\frac{n*(n+1)}{2}}$$

Where:

Ci is the coupling capacitance of an individual threshold length of one of the plurality of active noise wiring track structures and the at least one quiet wiring track structure;

Ct is the maximum coupling capacitance allowed for the total length of the plurality of active noise wiring track structures and the at least one quiet wiring track structure; and n is the number of threshold length segments of the plurality of active noise wiring track structures and the at least one quiet wiring track structure.

39. The computer system of claim 38, wherein the space between the plurality of active noise wiring track structures and the at least one quiet wiring track structure is calculated by the equation:

$$SPCi = \frac{Thri * Mtck * \varepsilon}{Ci}$$

Where:

SPCi is the space between the plurality of active noise wiring track structures and the at least one quiet wiring track structure;

Thri is the threshold length of a segment i of the threshold lengths of the wiring track length;

Mtck is the thickness of the plurality of active noise wiring track structures and the at least one quiet wiring track structure;

E is the permittivity of the inter-metal dielectric between the plurality of active noise wiring track structures and the at least one quiet wiring track structure; and Ci is the coupling capacitance of an individual threshold length of one of the plurality of active noise wiring track structures and the at least one quiet wiring track structure.

40. The computer system of claim 39 wherein a horizontal spacing between one of the plurality of active noise wiring track structures and the at least one quiet wiring track structure one each of the wiring track layers is calculated by the equation:

$$SPChi = \sqrt{ri^2 - h^2}$$

Where:

SPChi is the horizontal spacing between the quiet wiring track and one of the plurality of noise generating wiring tracks;

ri is the radial distance between the quiet wiring track and one of the plurality of noise generating wiring tracks;

i is the number designation of each of the segments of the active metal wiring track structures; and h is the vertical distance between the metal stack layer combinations of the wiring tracks.

* * * * *